(12) United States Patent
Sakurai et al.

(10) Patent No.: US 9,018,508 B2
(45) Date of Patent: Apr. 28, 2015

(54) PLAYING APPARATUS, METHOD, AND PROGRAM RECORDING MEDIUM

(71) Applicant: Casio Computer Co., Ltd., Tokyo (JP)

(72) Inventors: Keiichi Sakurai, Akishima (JP); Ryutaro Hayashi, Hamura (JP); Yuji Tabata, Ome (JP); Kazutaka Kasuga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 62 days.

(21) Appl. No.: 13/854,686

(22) Filed: Apr. 1, 2013

(65) Prior Publication Data

US 2013/0255476 A1    Oct. 3, 2013

(30) Foreign Application Priority Data

Apr. 2, 2012   (JP) .................................. 2012-084371

(51) Int. Cl.
*G10H 3/00* (2006.01)
*G10H 5/00* (2006.01)
(Continued)

(52) U.S. Cl.
CPC ................ *G10H 5/00* (2013.01); *G10H 1/0008* (2013.01); *G10H 2220/401* (2013.01);
(Continued)

(58) Field of Classification Search
CPC .............. G10H 5/00; G10H 2220/201; G10H 2220/185; G10H 2220/395; G10H 2220/391; G10H 2220/401; G10H 1/008; G01B 7/14; G01B 21/16
USPC ................... 84/723, 612, 645, 724, 725, 742; 702/150, 141; 700/94
See application file for complete search history.

(56) References Cited

U.S. PATENT DOCUMENTS 6,388,183 B1 * 5/2002 Leh .................................. 84/645
8,165,844 B2 * 4/2012 Luinge et al. .................. 702/152
(Continued)

FOREIGN PATENT DOCUMENTS

EP    1 583 073 A1    10/2005
EP    1 686 778 A1    8/2006
(Continued)

OTHER PUBLICATIONS

U.S. Appl. No. 13/853,781; First Named Inventor: Keiichi Sakurai; Title: "Orientation Detection Device, Orientation Detection Method and Program Storage Medium"; filed Mar. 29, 2013.
(Continued)

*Primary Examiner* — David Warren
*Assistant Examiner* — Christina Schreiber
(74) *Attorney, Agent, or Firm* — Holtz, Holtz, Goodman & Chick PC

(57) ABSTRACT

A sensor obtains an angular rate of a stick member. A sound source map includes plural areas disposed in a virtual space. CPU presumes a direction of a turning axis of the stick member based on the angular rate obtained by the sensor, while a user is operating the stick member, calculates an angular rate of a top of the stick member based on the angular rate obtained by the sensor with the angular rate in the longitudinal direction of the stick member removed, calculates a position of the holding member in the virtual space after a predetermined time, based on the recent direction of the turning axis of the stick member and recent angular rate of the top of the stick member, and sends a sound generating unit a note-on event of a musical tone assigned to an area corresponding to the calculated position among the plural areas.

6 Claims, 15 Drawing Sheets

(51) Int. Cl.
*G10H 7/00* (2006.01)
*G10H 1/00* (2006.01)
*G01B 21/16* (2006.01)
*G01B 7/14* (2006.01)
*G10H 1/42* (2006.01)

(52) U.S. Cl.
CPC ......... *G01B 21/16* (2013.01); *G10H 2220/201* (2013.01); *G01B 7/14* (2013.01); *G10H 1/42* (2013.01); *G10H 2220/185* (2013.01); *G10H 2220/391* (2013.01); *G10H 2220/395* (2013.01)

(56) References Cited

U.S. PATENT DOCUMENTS

| | | | |
|---|---|---|---|
| 8,655,622 B2* | 2/2014 | Yen et al. | 702/153 |
| 8,664,508 B2* | 3/2014 | Tabata | 84/723 |
| 8,710,345 B2* | 4/2014 | Tabata | 84/615 |
| 8,723,013 B2* | 5/2014 | Tabata | 84/615 |
| 8,759,659 B2* | 6/2014 | Tabata | 84/615 |
| 2005/0213476 A1* | 9/2005 | Choi et al. | 369/127 |
| 2006/0170562 A1* | 8/2006 | Choi et al. | 340/573.1 |
| 2007/0000374 A1* | 1/2007 | Clark et al. | 84/724 |
| 2007/0255434 A1* | 11/2007 | Inagaki | 700/94 |
| 2009/0216483 A1* | 8/2009 | Young | 702/138 |
| 2009/0325703 A1* | 12/2009 | Suzuki et al. | 463/37 |
| 2010/0009746 A1* | 1/2010 | Raymond et al. | 463/31 |
| 2010/0156785 A1* | 6/2010 | Nakaoka | 345/157 |
| 2010/0263518 A1* | 10/2010 | Nishitani et al. | 84/612 |
| 2011/0290097 A1* | 12/2011 | Takahashi et al. | 84/622 |
| 2012/0059494 A1* | 3/2012 | David | 700/94 |
| 2012/0070137 A1* | 3/2012 | Watanabe | 396/50 |
| 2013/0118339 A1* | 5/2013 | Lee et al. | 84/725 |
| 2013/0179034 A1* | 7/2013 | Pryor | 701/36 |
| 2013/0239783 A1* | 9/2013 | Tabata et al. | 84/609 |
| 2013/0239789 A1* | 9/2013 | Tabata | 84/741 |
| 2013/0255476 A1* | 10/2013 | Sakurai et al. | 84/723 |
| 2013/0262021 A1* | 10/2013 | Sakurai et al. | 702/141 |
| 2013/0262024 A1* | 10/2013 | Sakurai et al. | 702/150 |

FOREIGN PATENT DOCUMENTS

| | | |
|---|---|---|
| JP | 2007-256736 A | 10/2007 |
| JP | 2007256736 A * | 10/2007 |

OTHER PUBLICATIONS

U.S. Appl. No. 13/853,729; First Named Inventor: Keiichi Sakurai; Title: "Orientation Detection Device, Orientation Detection Method and Program Storage Medium"; filed Mar. 29, 2013.

"Wii MotionPlus", Wikipedia.org, URL: https://en.wikipedia.org/w/index.php?title=Wii_MotionPlus&oldid=482109037, Sections: Technology.

Sawada H. et al., "Gesture Recognition Using an Acceleration Sensor and its Application to Musical Performance Control", Electronics & Communications in Japan, Part 3, vol. 80, No. 5, May 1997.

* cited by examiner

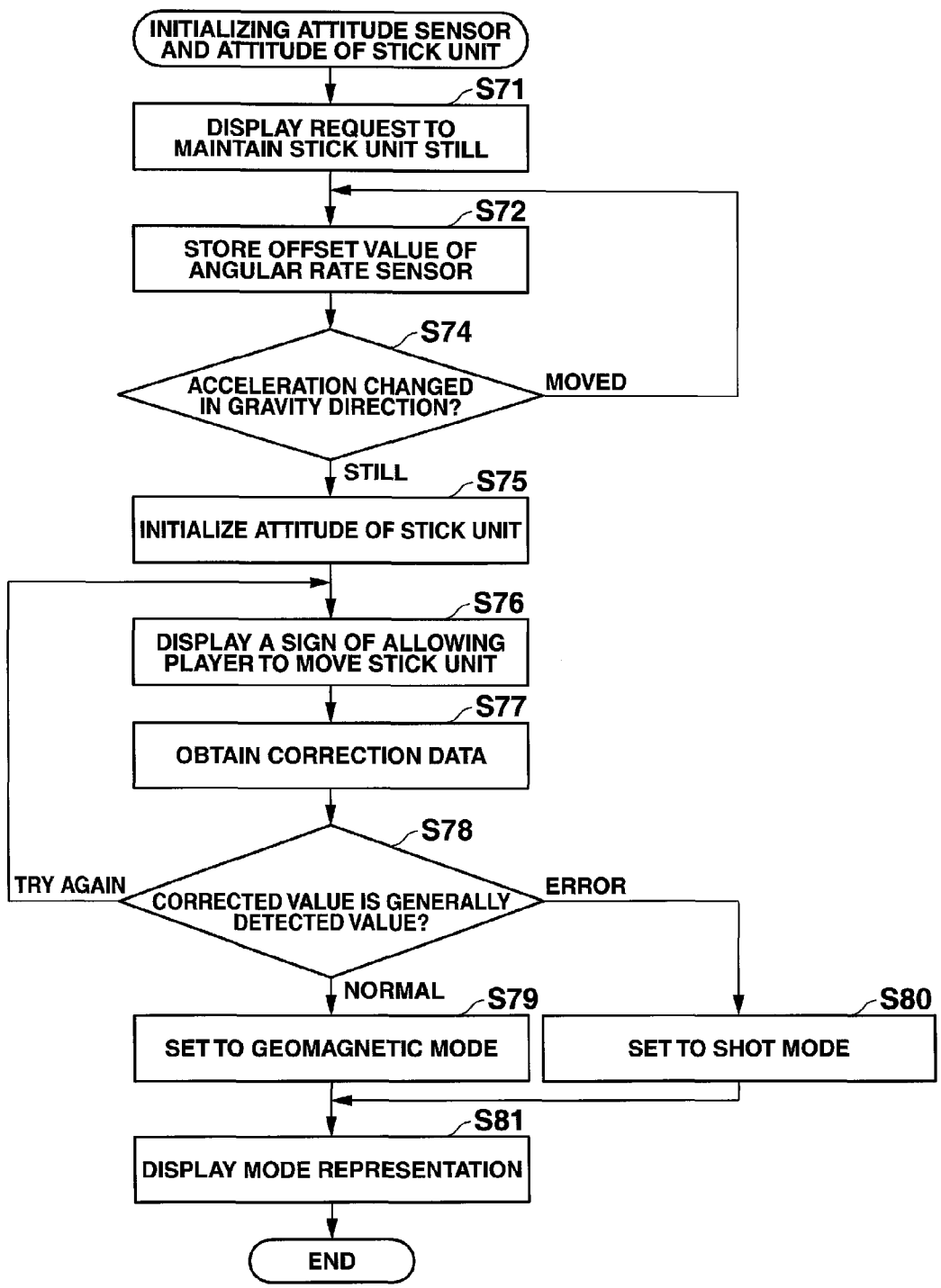

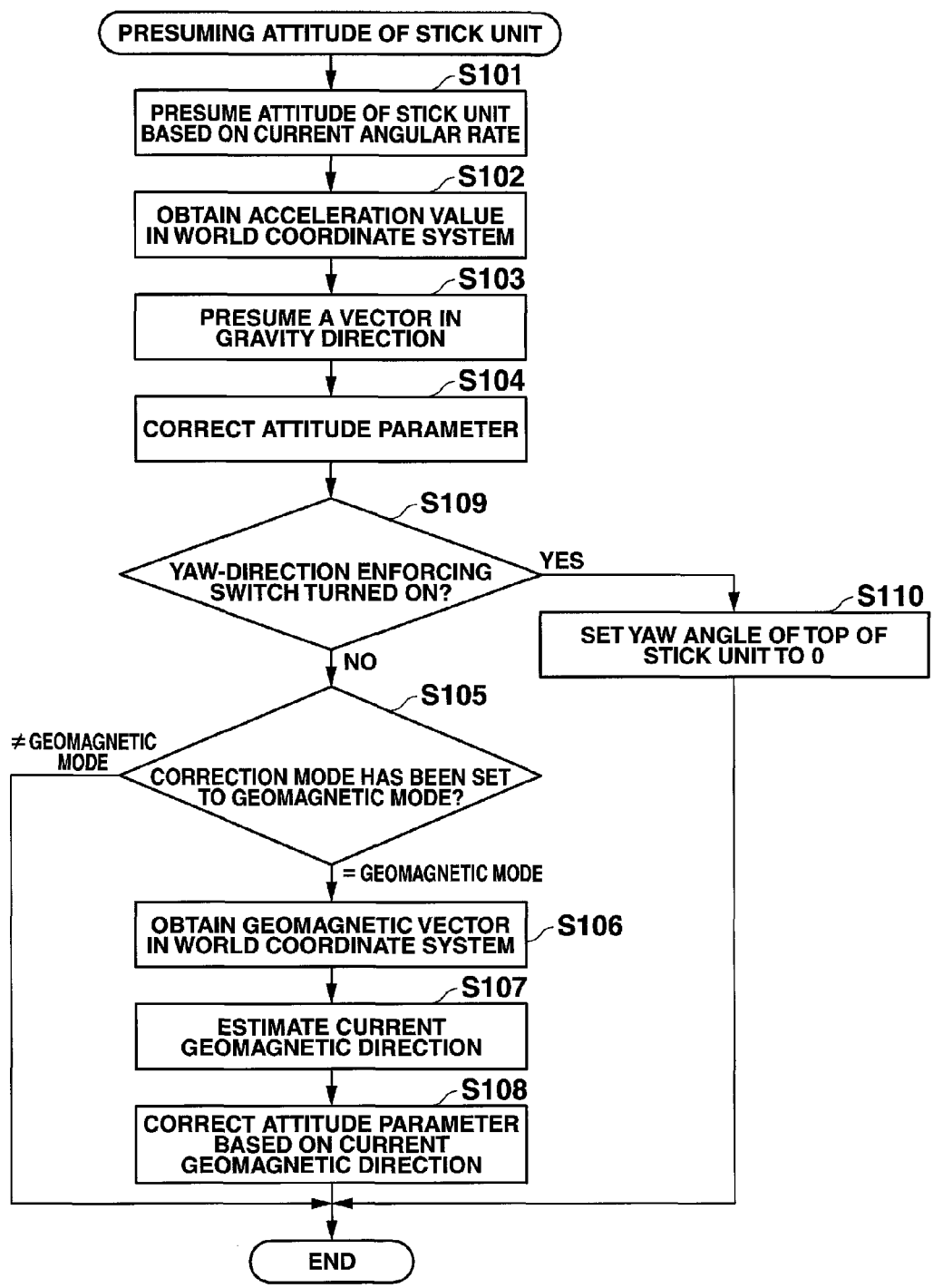

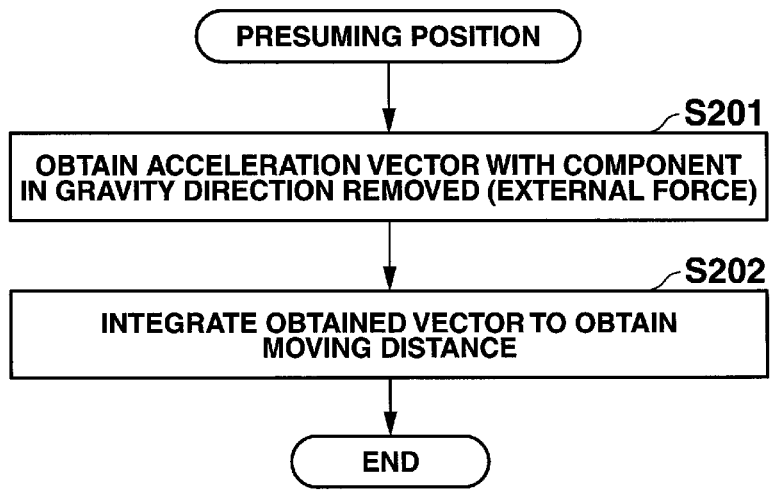
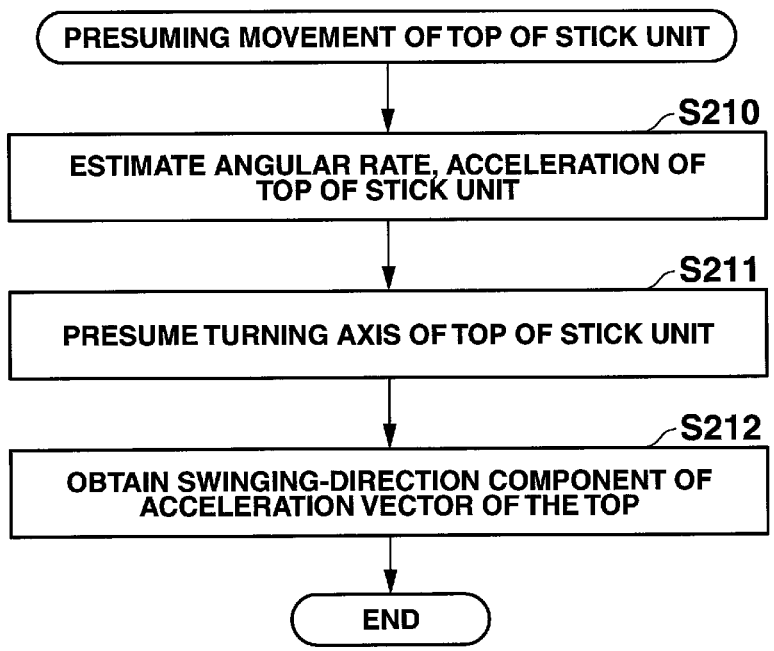

PLAYING APPARATUS, METHOD, AND PROGRAM RECORDING MEDIUM

CROSS-REFERENCE TO RELATED APPLICATION

The present application is based upon and claims the benefit of priority from the prior Japanese Patent Application No. 2012-084371, filed Apr. 2, 2012, the entire contents of which are incorporated herein by reference.

BACKGROUND OF THE INVENTION

1. Field of the Invention

The present invention relates to a playing apparatus, a playing method, and a program recording medium.

2. Description of the Related Art

In the past, a playing apparatus was proposed, which generated a sound corresponding to a player's motion, when sensing the player's playing motion. For example, a playing apparatus is known, which consists only of a stick member and generates percussion sounds. The stick member of this conventional playing apparatus is provided with a sensor. When the player holds the stick member with his or her hand and swings the stick member down or up, the sensor senses the player's playing motion, making the playing apparatus generate percussion sounds.

Using a virtual instrument like the above conventional playing apparatus, the player can enjoy playing music without playing the real musical instrument and with no restriction in performance places and/or performance spaces.

An example of the virtual musical instrument, a playing apparatus is disclosed in Japanese Unexamined Patent Publication No. 2007-256736, which apparatus is used with a stick-like member. The stick-like member is provided with an acceleration sensor. When a user swings the stick-like member down or up, the acceleration sensor detects an acceleration and sends the detected acceleration to the playing apparatus. When such acceleration exceeds a given threshold value, the playing apparatus generates a musical tone.

Ideally, it is preferable for the playing apparatus to generate a musical tone at the moment when the velocity of the stick-like member has reduced to "0" after increasing for a while, when the user starts swinging the stick-like member. The playing apparatus disclosed in Japanese Unexamined Patent Publication No. 2007-256736 detects the acceleration in the direction opposite to the direction in which the stick-like member is swung down and generates the musical tone at the time when such acceleration has exceeded the threshold value. In the playing apparatus, a time delay from the time when a timing signal of sound generation is produced to the time when a musical tone is generated is not considered, and therefore a problem is invited that can delay the timing of sound generation.

Another playing apparatus has been proposed, which sets the timing of sound generation at the time when a decreasing angular rate of the stick has fallen below a predetermined threshold value, thereby setting the timing of sound generation at a time a predetermined time earlier than a shot timing at which a sound is supposed to be generated. This playing apparatus generates a sound at a time when the stick has come to a position before reaching to the position corresponding to the shot timing. But the playing apparatus has a disadvantage that can generate a musical tone of a tone color different from a musical tone of a tone color supposed to be generated, in accordance with the position of the stick at the correct shot timing, when the stick is swung down slantwise.

SUMMARY OF THE INVENTION

The present invention has been made in consideration of the disadvantages involved in the conventional apparatuses, and provides a playing apparatus, which can generate a musical tone of a tone color in accordance with a position of a stick at a correct shot timing, even if the stick is swung down slantwise.

According to one aspect of the invention, there is provided a playing apparatus, which comprises a holding member operated by a user, an angular rate sensor mounted on the holding member for obtaining angular rates of the holding member respectively in three axial directions, the three axial directions including a longitudinal direction of the holding member and being perpendicular to each other, a storing unit for storing a sound source map including plural areas disposed in a virtual space and sound sources corresponding respectively to the plural areas, a presuming unit for presuming a direction of a turning axis of the holding member based on the angular rates of the holding member obtained by the angular rate sensor, while the user is operating the holding member, a first calculating unit for calculating an angular rate of a top of the holding member based on the angular rates of the holding member obtained by the angular rate sensor with the angular rate in the longitudinal direction removed, a second calculating unit for calculating a position of the holding member in the virtual space after a predetermined time, based on the recent direction of the turning axis of the holding member presumed by the presuming unit and the recent angular rate of the top of the holding member calculated by the first calculating unit, and a sound-generation instructing unit for providing a sound generation signal to a sound generating unit for instructing a generation of a sound which is assigned to an area corresponding to the position calculated by the second calculating unit in a swinging motion among the plural areas included in the sound source map.

The playing apparatus according to the invention can generate a musical tone of a tone color corresponding to the stick position at the correct shot timing, even if the sick has been swung slantwise.

BRIEF DESCRIPTION OF THE DRAWINGS

FIG. 7 is a flow chart of a process of initializing an attitude sensor and an attitude of the stick unit.

FIG. 8 is a flow chart of a process of presuming the attitude of the stick unit.

FIG. 9 is a flow chart of a process of presuming a position of the stick unit.

FIG. 10 is a flow chart of a process of presuming a movement of the top of the stick unit.

DETAILED DESCRIPTION OF THE PREFERRED EMBODIMENTS

Now, the embodiments of the present invention will be described with reference to the accompanying drawings in details.

Figure 1:
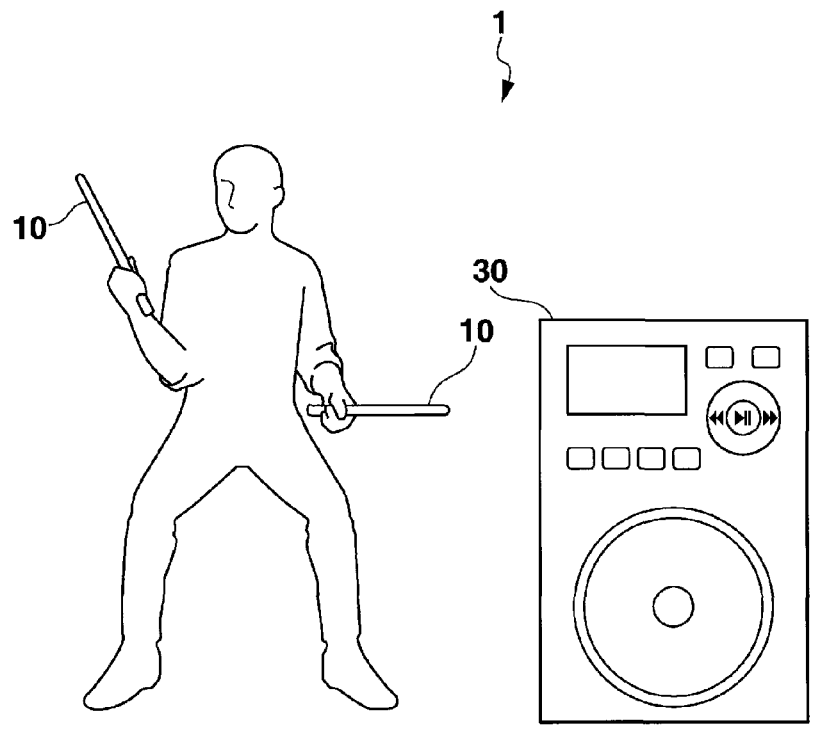
FIG. 1 is a view schematically illustrating a playing apparatus according to one embodiment of the invention.

FIG. 1 is a view schematically showing a playing apparatus 1 according to one embodiment of the invention. As shown in FIG. 1, the playing apparatus 1 of the invention comprises stick units 10 and a sound generating unit 30. The stick unit 10 consists of a stick member extending in its longitudinal direction. A player holds one end (base end) of the stick unit 10 with his or her hand and makes a motion of swinging the stick unit 10 up and down with his or her wrist kept at the center of the motion. An attitude sensor 12 (refer to FIG. 2) is mounted on the other end (top end) of the stick unit 10 to detect the player's playing motion.

The sound generating unit 30 serves to generate musical tones. In the playing apparatus 1, the sound generating unit 30 generates a predetermined musical tone in response to the player's motion using the stick unit 10 or the player's motion of swinging the stick unit 10 down, whereby the player gives a performance.

[Configuration of Playing Apparatus]

The configuration of the stick unit 10 will be described with reference to FIG. 2 in detail. Also, the configuration of the sound generating unit 30 will be described with reference FIG. 3 in detail.

Figure 2:
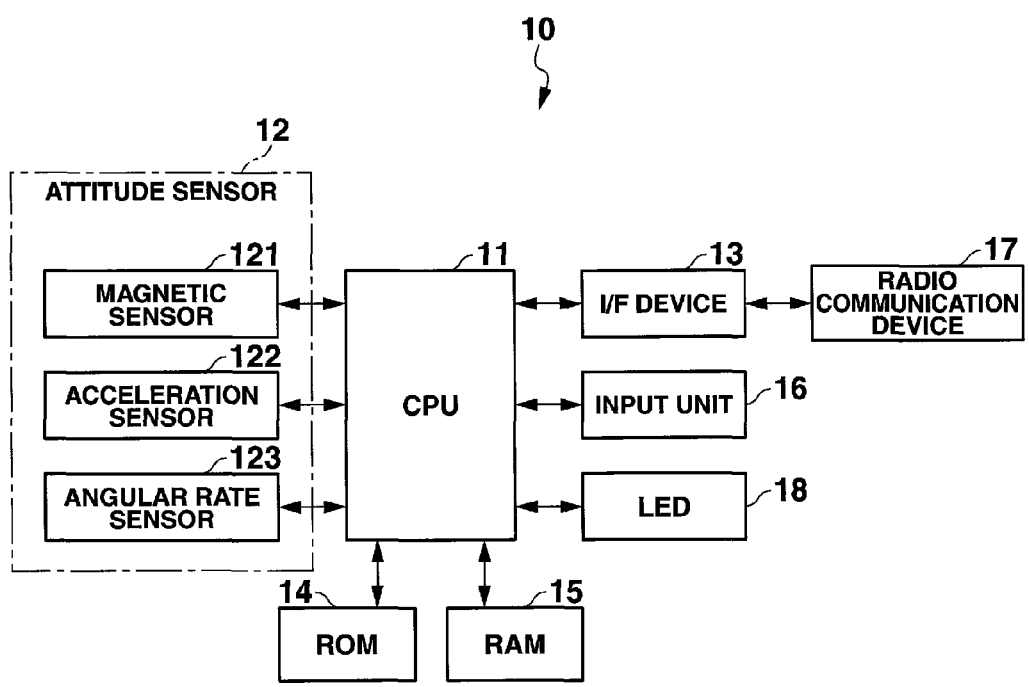
FIG. 2 is a block diagram showing a configuration of a stick unit of the playing apparatus according to the embodiment of the invention.

FIG. 2 is a block diagram showing the configuration of the stick unit 10 of the present playing apparatus 1. As shown in FIG. 2, the stick unit 10 comprises CPU (Central Processing Unit) 11, the attitude sensor 12, I/F (interface) device 13, ROM (Read Only Memory) 14, RAM (Random Access Memory) 14, RAM (Random Access Memory) 15, an input unit 16, a radio communication device 17 and LED 18.

Further, the attitude sensor 12 comprises a three-axis magnetic sensor 121, a three-axis acceleration sensor 122, and a three-axis angular rate sensor 123. The three-axis magnetic sensor 121 serves to measure the magnetic direction, the three-axis acceleration sensor 122 serves to measure an acceleration applied to the stick unit 10, and the three-axis angular rate sensor 123 serves to measure a rotary motion of the stick unit 10. These three sensors are able to measure data respectively in the x, y, and z axial directions.

Figure 4:
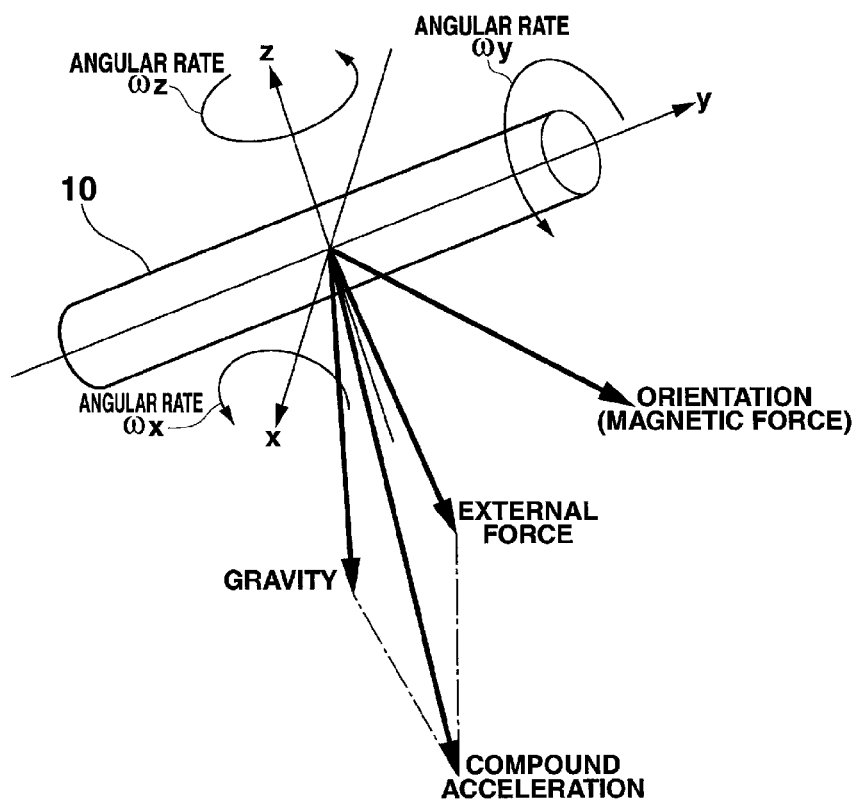
FIG. 4 is a view for explaining the details of the stick unit of the playing apparatus according to the embodiment of the invention.

In the present embodiment, it is assumed in FIG. 4 that an axis corresponding to the longitudinal axis of the stick unit 10 is the y-axis, an axis perpendicular to the y-axis and parallel to a substrate (not shown), on which the attitude sensor 12 is mounted is the x-axis, and an axis perpendicular to the x-axis and the y-axis is the z-axis. The magnetic sensor 121 is able to obtain three geomagnetic components of a geomagnetic vector respectively in the x-axis, y-axis and z-axis directions. The acceleration sensor 122 is able to obtain three components of an acceleration respectively in the x-axis, y-axis and z-axis directions. The angular rate sensor 123 is able to obtain three components (ωx, ωy, ωx) of an angular rate respectively in the x-axis, y-axis and z-axis directions.

The player holds one end (base end) of the stick unit 10 with his or her hand and makes a swinging motion of the stick unit 10 up and down with his or her wrist kept at the center of the motion, thereby giving the stick unit 10 a rotational movement and/or a parallel movement. The attitude sensor 12 detects the movement of the stick unit 10 and supplies the detected movement to CPU 11.

The attitude sensor 12 detects an acceleration, an angular rate, a geomagnetic direction, a geomagnetic value of the stick unit 10, and supplies these detected values to CPU 11. CPU 11 detects an attitude of the stick unit 10 and a timing of a sound generation, based on the received values. Further, CPU 11 produces a note-on event corresponding to the sound generation, and sends the note-on event to the sound generating unit 30 through I/F device 13 and the radio communication device 17. The note-on event is command information, which gives a sound source unit 371 (Refer to FIG. 3) an instruction of generating a musical tone. In the present embodiment, the note-on event contains information of a volume of the musical tone to be generated in addition to information of a tone color and a pitch of the musical tone to be generated.

As described above, the attitude sensor 12 mounted on the stick unit 10 detects sensor values. CPU 11 produces the note-on event based on the sensor values detected by the attitude sensor 12, and sends the produced note-on event to the sound generating unit 30. The sound generating unit 30 can generate a predetermined musical tone based on the note-on event supplied from CPU 11, that is, the sound generating unit 30 can generate the predetermined musical tone in response to the player's playing motion using the stick unit 10.

ROM 14 serves to store various process programs for CPU 11 to perform various processes. More specifically, ROM stores programs for performing various processes, including a data-obtaining process by the attitude sensor 12, a note-on event producing process, and a note-on event sending process. RAM 15 serves to store various sensor values detected by the attitude sensor 12, and data obtained and/or produced in the processes. I/F device 13 transfers data to the radio communication device 17 in accordance with an instruction from CPU 11.

The input unit 16 has various sorts of switches (not shown). The player operates the input unit 16 to input various instructions.

The radio communication device 17 performs predetermined radio communication with the sound generating unit 30. The predetermined radio communication is performed in an arbitrary manner. In the present embodiment, the radio communication device 17 uses infrared communication to communicate with the sound generating unit 30. LED 18 is made to turn on or off under control of CPU 11. LED 18 is used to indicate whether the attitude of the stick unit 10 has been initialized or not.

[Configuration of Sound Generation Unit]

Figure 3:
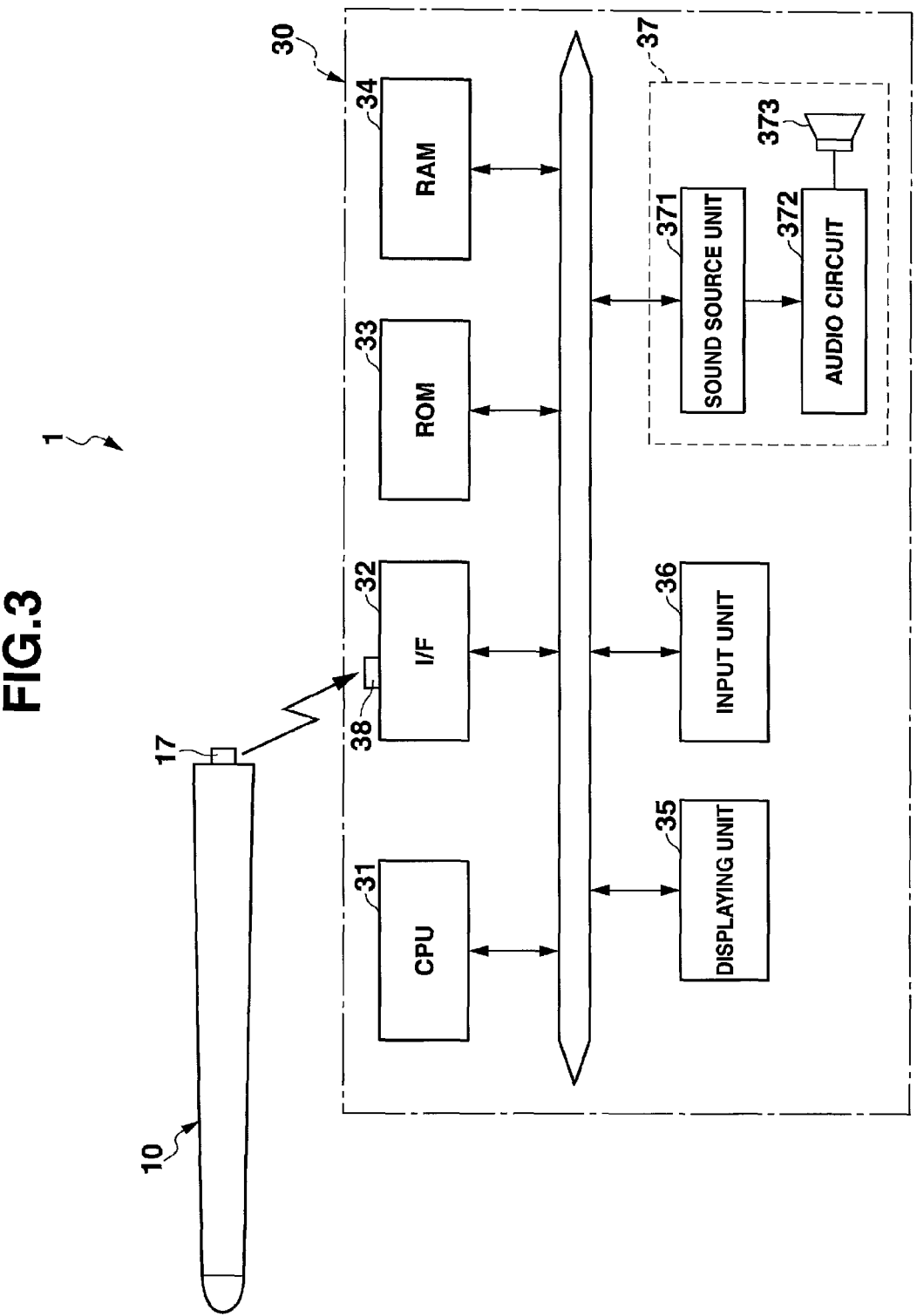
FIG. 3 is a block diagram showing a configuration of a sound generating unit of the playing apparatus according to the embodiment of the invention.

FIG. 3 is a block diagram showing a configuration of the sound generating unit 30 of the present playing apparatus 1. As shown in FIG. 3, the sound generating unit 30 comprises CPU 31, I/F (interface) device 32, ROM 33, RAM 34, a displaying unit 35, an input unit 36, and a sound system 37. The stick unit 10 outputs data (for example, note-on event or controlling data for generating a musical tone). I/F device 32 of the sound generating unit 30 receives the data from the stick unit 10, stores the data in RAM 34, and gives CPU 31 notice of receipt of the data. In the present embodiment, the stick unit 10 is provided with the radio communication device 17 and the sound generating unit 30 is provided with the infrared communication device 38. I/F (interface) device 32 receives a radio signal sent from the radio communication device 17 of the stick unit 10 through the infrared communication device 38, whereby I/F (interface) device 32 receives the data from the stick unit 10.

CPU 31 controls the whole operation of the playing apparatus 1. In particular, CPU 31 performs various processes, including controlling the operation of the sound generating unit 30, detecting operated key switches (not shown) of the input unit 36, and generating a musical tone based on the note-on event received from the stick unit 10 through I/F device 32.

ROM 33 serves to store various process programs for controlling the operation of the sound generating unit 30, detecting operated key switches (not shown) of the input unit 36, and generating a musical tone based on the note-on event received from the stick unit 10 through I/F device 32. ROM 33 has a waveform data area for storing waveform data of various tone colors, including waveform data of various musical instruments, for example, wind instruments such as flutes, saxophones, trumpets, keyboard instruments such as pianos, string instruments such as guitars, percussion instruments such as bass drums, hi-hats, snare drums, cymbals, and toms.

RAM 34 serves to store the program read from ROM 33, and data and parameters generated in the course of the performed process. The data generated in the course of the performed process includes data representing the operated switches of the input unit 36, the note-on event received through I/F device 32, and data (advance flag, variation) representing the player's motion.

The displaying unit 37 comprises, for example, a liquid crystal displaying device, and displays an image representing a selected tone color and sound volume and the player's motion (a displacement from a reference position). The input unit 36 has various sorts of switches (not shown). The player operates the input unit 36 to input various instructions.

The sound system 37 comprises a sound source unit 371, an audio circuit 372, and a speaker 373. In accordance with the instruction sent from the CPU 31, the sound system 371 reads waveform data from the waveform area of ROM 33, and produces and outputs musical-tone data. The audio circuit 372 converts the musical-tone data sent from the sound source system 371 into an analog signal, and amplifies and outputs the analog signal from the speaker 373, whereby the musical tone is output from the speaker.

[Explanation of Coordinate System]

Figure 5:
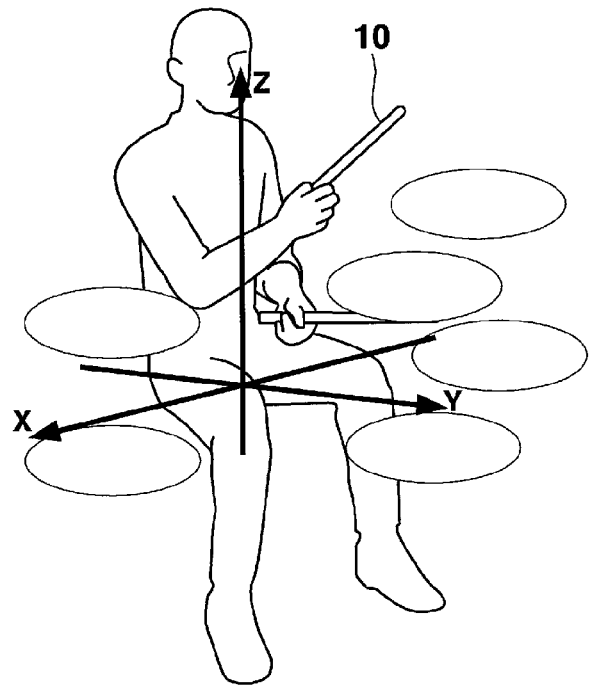
FIG. 5 is a view for explaining a world coordinate system in the playing apparatus according to the embodiment of the invention.

An attitude of the stick unit 10 and the world coordinate system in the present embodiment will be described with reference to FIG. 5. In the present embodiment, the world coordinate system means a coordinate system having the player at its center. As seen from the player in FIG. 5, the X-axis will be defined as the axis in the horizontal direction, the Y-axis will be defined as the axis in the front-back direction, and the Z-axis will be defined as the axis in the zenith direction. The X-axis, Y-axis, and Z-axis shown in FIG. 5 are different from the x-axis, y-axis, and z-axis of the stick unit 10 shown in FIG. 4. In the present embodiment, three axes of the stick unit 10 are referred to as a "local coordinate system" and are indicated in lowercase. Meanwhile, the three axes in the world coordinate system are indicated in uppercase. When the player swings the stick unit 10, a relationship between the local coordinate system and the world coordinate system changes in time, and a manner, in which the orientation of the local coordinate system of the stick unit 10 changes, as seen from the world coordinate system, is referred to as the attitude of the stick unit 10.

When the stick unit 10 moves, also the origin of the local coordinate system moves, as seen from the origin of the world coordinate system. As seen from the origin of the world coordinate system, the origin of the local coordinate system is referred to as a position of the stick unit 10.

[Process Performed by Playing Apparatus]

A process to be performed by the playing apparatus 1 according to the present embodiment will be described. At first, an outline of a process performed by the stick unit 10 will be described with reference to a flow chart of FIG. 6.

Figure 6:
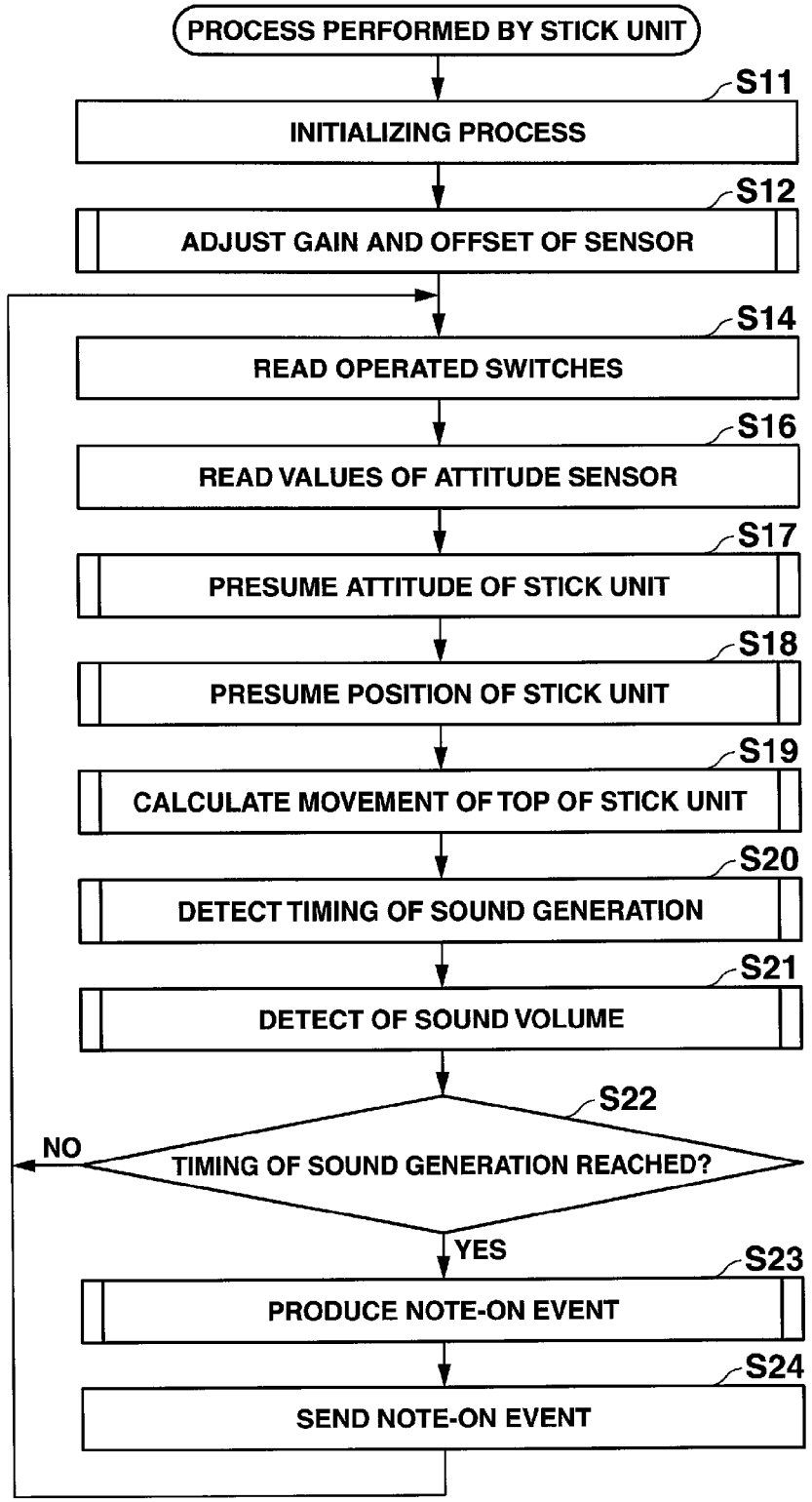
FIG. 6 is a flow chart of a process performed by CPU of the stick unit.

FIG. 6 is a flow chart showing the process performed by CPU 11 of the stick unit 10. CPU 11 reads program codes from ROM 14 to perform the process.

CPU 11 performs an initializing process (step S11), initializing the various sensors of the attitude sensor 12 and clearing data in RAM 15. Then, CPU 11 adjusts offsets and gains of the various sensors of the attitude sensor 12, which vary due to variations in their components and environment temperature (step S12). CPU 11 reads a state of the operated switches of the input unit 36 and stores the state of the operated switches in RAM 15 (step S14). The state of the operated switches is used in a detecting a position of the stick unit 10 to be described later.

Further, CPU 11 performs processes (step S16 to step S24) to generate a musical tone in response to the player's motion of swinging the stick unit 10. CPU 11 stores in RAM 15 the acceleration, the angular rate, the geomagnetic direction, and the geomagnetic value detected by the attitude sensor 12 (step S16).

CPU 11 uses the values detected by the attitude sensor 12 to presume an attitude of the stick unit 10 (step S17), and further presumes a position, to which the stick unit 10 has moved in the horizontal direction (step S18). Further, CPU 11 calculates the movement of the top of the stick unit 10 (step S19), and uses the calculated movement of the stick unit 10 to detect a timing of sound generation (step S20) and a volume of the sound to be generated (step S21). When it is determined at step S22 that the timing of the sound generation has been reached (the operating state is "SHOT") (YES at step S22), CPU 11 determines a tone color and a pitch of the musical note to be generated, in accordance with the attitude and position of the stick unit 10, and produces a note-on event (step S23). Then CPU 11 sends the produced note-on event to the sound generating unit 30 (step S24).

[Initialization of Attitude Sensor and Attitude of Stick Unit]

The process (step S12 in FIG. 6) of initializing the attitude sensor 12 and the attitude of the stick unit 10 will be described with reference to a flowchart of FIG. 7 in detail.

FIG. 7 is a flow chart showing the process of initializing the attitude sensor 12 and the attitude of the stick unit 10. CPU 11 displays a request to the user to maintain the top of the stick unit 10 in the front direction (step S71). In other words, CPU 11 turns on LED 18 in green to make such request.

CPU 11 reads data of the angular rate sensor 123 detected in the respective axis directions. In general, an offset value of the angular rate sensor 123 varies due to the variation in the components and the environment temperature at the time when the angular rate is zero. CPU 11 stores in RAM 15 as the offset value the value which the angular rate sensor 123 indicates at the time when the angular rate is zero (step S72). At the following steps, CPU 11 subtracts the offset value from a value detected by the angular rate sensor 123 so as to make the stick unit 10 show that its angular rate is zero, when said stick unit 10 is kept still.

CPU 11 reads data of the acceleration sensor 122 detected in the respective axis directions, and compares the currently detected data with just previously detected data to determine whether or not the acceleration has changed in the gravity direction (step S74). More specifically, the data detected by the acceleration sensor 122 has its axial component only in the gravity direction and no axial components in other directions, when the stick unit 10 is kept in the still state. Therefore, when no variation is detected in each axial component by the acceleration sensor 122, CPU 11 can determine that the stick unit 10 is kept still. In the resent embodiment, when no variation appears in each axial component for about one second, CPU 11 determines that the stick unit 10 is kept in the still state. When it is detected that the stick unit 10 has been kept in the still state, CPU 11 registers the offset value of the angular rate in RAM 15, and advances to step S75. Meanwhile, when it is detected that the stick unit 10 has moved, CPU 11 returns to step S72, and tries to register the offset value of the angular rate, again.

CPU 11 initializes the attitude of the stick unit 10 (step S75). More specifically, with the top of the stick unit 10 kept in the front direction, CPU 11 initializes the relationship between the world coordinate system and the local coordinate system, such that the direction, in which the top of the stick unit 10 is kept will meet the direction of the Y-axis of the world coordinate system. Further, CPU 11 stores in RAM 15 the axial components of the angular rate, acceleration, and geomagnetic value, which are indicated at the time, when the coordinate systems are initialized.

Further, CPU 11 displays a sign of allowing the player to move the stick unit 10 in various directions (step S76). For example, CPU 11 makes LED 18 blink in red.

CPU 11 obtains correction data for the offsets and the gain of the magnetic sensor 121 (step S77). More specifically, the magnetic sensor 121 detects geomagnetic values in response to the user's motion of moving the stick unit 10 in various directions at step S76. CPU 11 uses the geomagnetic values detected by the magnetic sensor 121 to obtain the correction data. Further, CPU 11 calculates the medians of the axial values detected by the magnetic sensor 121, using the maximum and minimum values, and uses the calculated medians of the respective axial values as the offset values.

CPU 11 calculates a gain correction value such that values on the respective axes from the median to the maximum value will be equivalent. CPU 11 stores the calculated offset values and the gain correction value in RAM 15. At the following steps, CPU 11 reads axial values from the magnetic sensor 121, subtracts the offset values from the read axial values to obtain differences. Further, CPU 11 multiplies the differences by the gain correction value to obtain a corrected geomagnetic value. The corrected magnetic value is used as a detected geomagnetic value.

CPU 11 judges whether or not the corrected geomagnetic value (detected value) is a value, which is generally detected above ground (step S78). When it is determined that the detected geomagnetic value is not a value generally detected above ground (NO at step S78), CPU 11 returns to step 76 and tries to obtain the offset values and the gain correction value of the magnetic sensor 121 again. When it is determined that the detected geomagnetic value is a value generally detected above ground (YES at step S78), CPU 11 advances to step S79 and sets a yaw correction mode to a geomagnetic mode.

In the case where the detected geomagnetic value is not a value, which is generally detected above ground even though the process of step S78 is performed a predetermined times (for example, 5 times), CPU 11 advances to step S80, and sets the yaw correction mode to a shot mode. After the process at step S79 or at step S80, CPU 11 advances to step S81 and displays that the yaw correction mode has been set to the geomagnetic mode or that the yaw correction mode has been set to the shot mode. For example, when the yaw correction mode is the shot mode, CPU 11 makes LED 18 blink in red. When the yaw correction mode has been set to the geomagnetic mode, CPU 11 makes LED 18 blink in green. The sequence of performing the correction processes for the angular rate sensor 123 and the magnetic sensor 121 is not fixed and can be changed.

[Presumption of Attitude of Stick Unit]

The process (step S17 in FIG. 6) of presuming the attitude of the stick unit 10 will be described with reference to a flow chart of FIG. 8 in detail.

FIG. 8 is a flow chart showing the process of presuming the attitude of the stick unit 10 (attitude presuming process).

Basic vectors on the x-axis, y-axis, and z-axis of the local coordinate system seen from the world coordinate system are expressed as $e_x$, $e_y$, and $e_z$, respectively, and a matrix of the basic vectors in column is defined as $T_{L\to W}=(e_x\ e_y\ e_z)$. Then, the following relational expressions (1), (2) will be established between a point "p" in the local coordinate system, $p=(x\ y\ z)^T$ and the corresponding point "P" in the world coordinate system, $P=(X\ Y\ Z)^T$.

$$P=T_{L\to W}p \quad (1)$$

$$p=T_{L\to W^T}P \quad (2)$$

A symbol of operation T represents a transposed matrix.

In the above expressions, $T_{L\to W}$ indicates a relationship between the two coordinate systems. Using the relationship between the two coordinate systems, the present attitude of the stick unit 10 can be expressed. An angle representing a pitch, paw, and/or roll can be used to express the attitude of the stick unit 10.

It is possible to obtain three dimensional angular rate vector having axial components in the local coordinate system from values, which are read from the angular rate sensor 123 at the present time "t". Then a rotation angle vector $\theta t=(\theta_{xt}\ \theta_{yt}\ \theta_{zt})^T$ can be obtained by multiplying the axial components of the three dimensional angular rate vector by a sampling time $\delta T$ of the angular rate sensor 123.

Using the rotation angle vector, the attitude of the stick unit 10 can be obtained. More specifically, using a compound matrix $R_{all}(\theta t)$ of a rotation angle $\theta_{xt}$ about the x-axis, a rotation angle $\theta_{yt}$ about the y-axis, and a rotation angle $\theta_{zt}$ about the z-axis, and the previous attitude $T_{L\to Wt-1}$ of the stick unit 10, the attitude $T_{L\to Wt}$ of the stick unit 10 at a time of "t" can be presumed as follows:

$$T_{L\to Wt}=R_{all}(\theta t)\cdot T_{L\to Wt-1}$$

In this manner, CPU 11 updates the previous attitude of the stick unit 10 on the basis of the values currently detected by the angular rate sensor 123 to presume the current attitude of the stick unit 10 (step S101).

But it is inevitable that errors accumulate in the attitude of the stick unit 10 presumed in the above mentioned manner.

Once the attitude of the stick unit 10 has been presumed in error, the presumption of the attitude thereafter will be significantly worse in accuracy. For example, it is assumed that the stick unit 10 is kept on a virtual horizontal plane in the front direction at first and then turned to the right on the virtual horizontal plane. In the case where the stick unit 10 is not turned in the virtual horizontal plane but in a virtual vertical plane, the top of the stick unit 10 will turn so as to draw a track obliquely upward. Thereafter, the stick unit 10 will be moved in another direction, and therefore the attitude of the stick unit 10 will separate from its rightful attitude. A presumption based on weight corrects the attitude presumption, enhancing the accuracy of the attitude presumption.

An acceleration vector detected by the acceleration sensor 122 consists of axial components in the local coordinate system. The acceleration vector will be expressed in the world coordinate system using the attitude information obtained at step S101.

If no external force is applied to the stick unit 10, the acceleration sensor 122 will detect only weight of the stick unit 10. Therefore, when the acceleration vector detected by the acceleration sensor 122 in the local coordinate system is converted into the acceleration vector in the world coordinate system, the acceleration vector in the world coordinate system indicates the same direction at all times. Since the external force such as centrifugal force is applied thereto while the stick unit 10 is being moved, the acceleration vector in the world coordinate system does not always indicate the same direction at all times. But since the user swings the stick unit 10 up and down while he or she stays still, the position of the stick unit 10 does not move. Further, when the stick unit 10 has been swung up or down, a velocity of the stick unit 10 will be reduced to "0" at such times. That is, the integral of the external force of the acceleration vector with a gravity component removed will be "0" at such times. Therefore, a vector will generally indicate a gravity direction, which vector is obtained by integrating the acceleration vector in the world coordinate system. The gravity direction of the world coordinate system will be estimated based on this feature.

More specifically, the acceleration sensor 122 detects an acceleration value $_L A_T$ having the axial components at the current time "t": $_L A_T = (A_{xt}\ A_{yt}\ A_{zt})^T$ CPU 11 uses the following expression (3) to convert the acceleration value in the local coordinate system into the acceleration value in the world coordinate system (step S102).

$$_W A_T = T_{L\to Wt\ L} T_A \quad (3)$$

Concerning the acceleration value converted into the world coordinate system, CPU 11 calculates an average of each of the axial components of the acceleration value during a period from the current time to a predetermined time to obtain an average acceleration vector. This predetermined time will be experimentally determined based on a swinging state of the stick unit 10. CPU 11 presumes that the average acceleration vector is equivalent to a gravity-direction vector $we_{gt}$ (step S103).

More specifically, the following expression (4) is defined and an accumulation is effected using a recursive calculation, where Kg is a dumping coefficient, which is experimentally determined based on a swinging state of the stick unit 10.

$$Gw_t = k_g \cdot Gw_{t-1} + wA_t \quad (4)$$

The gravity-direction vector $we_{gt}$ in the world coordinate system is estimated from the above $Gw_t$ as follows:

$$wegt = Gw_t / |Gw_t|$$

Then, CPU 11 corrects an attitude parameter $T_{L\to Wt}$ such that the gravity-direction vector $we_{gt}$ will be a negative vector $(0\ 0\ -1)^T$ in the direction of the Z-axis (step S104). More specifically, CPU 11 operates to rotate about an axis perpendicular both to the gravity-direction vector $we_{gt}$ and the negative vector $(0\ 0\ -1)^T$ by an angle between the two vectors, thereby correcting the attitude parameter $T_{L\to Wt}$. In this manner, correction is made in the gravity direction, enhancing the accuracy of the presumption of the attitude of the stick unit 10.

Since the above described attitude correction is made only in the gravity direction, accumulation of errors of the yaw angle about the Z-axis remains in the attitude of the stick unit 10. The present embodiment proposes two methods of correcting the yaw angle, one is by a switch operation by the user and other is by detecting a geomagnetic vector.

The correction of the yaw angle depending on the switch operation by the user will be described. The yaw angle is corrected, when the user periodically operates the input unit 16 (for example, the switch) provided on the stick unit 10 at a time when the stick unit 10 is kept in the front direction. CPU 11 judges whether or not a yaw-direction enforcing switch has been turned on (step S109). In this judgment, CPU 11 judges whether or not a signal has been received, indicating that the yaw-direction enforcing switch is turned on.

When it is determined YES at step S109, CPU 11 obtains a rotation matrix, which will make a directional vector of the top of the stick unit 10 in the world coordinate system conform to a directional vector of the Y-axis in the world coordinate system. Using the rotation matrix, CPU 11 corrects the attitude parameter (step S110), whereby the yaw angle of the top of the stick unit 10 will be set to "0" degree.

For example, a rotation vector orthogonal to two vectors is considered, which has the same magnitude as the two vectors and an angle made by the two vectors between them. The compound-matrix transformation of the rotation vector can be obtained in the same manner as the manner in which the compound rotation-matrix for the attitude correction of the angular rate sensor 123 is obtained. The rotation matrix is expressed by the compound-matrix transformation.

The correction of the yaw angle by using the geomagnetic vector will be described.

When it is determined NO at step S109, that is, when it is determined that the signal indicating that the yaw-direction enforcing switch is turned on has not been received (NO at step S109), CPU 11 judges whether or not a yaw-direction correction mode has been set to the correction mode by the geomagnetic mode (step S105). When it is determined that the yaw-direction correction mode has not been set to the correction mode by the geomagnetic mode, CPU 11 finishes the attitude presuming process. When it is determined that the yaw-direction correction mode has been set to the correction mode by the geomagnetic mode, CPU 11 reads a value $_L M_T$ of the geomagnetic vector from the magnetic sensor 121 at the current time "t": $_L M_T = (M_{xt}\ M_{yt}\ M_{zt})^T$ Further CPU 11 transforms the value $_L M_T$ of the geomagnetic vector in the local coordinate system into the value of the geomagnetic vector in the world coordinate system using the following expression (5) (step S106).

$$_W M_T = T_{L\to W_t\ L} M_T \quad (5)$$

CPU 11 executes IIR (Infinite Impulse Response) filtering on the value of the geomagnetic vector in the world coordinate system to obtain a smoothed value, and estimates the direction of the smoothed value as a current geomagnetic direction $we_{mt}$ (step S107).

More specifically, the following IIR filtering expression (6) is performed on the value of the geomagnetic vector to smooth the same value, where km is a filter coefficient, which is experimentally determined based on the swinging state of the stick unit 10.

$$Mw_t = (1-km) \cdot Mw_{t-1} + k_m \cdot wA_t \quad (6)$$

The current geomagnetic direction vector we in the world coordinate system is estimated from $Mw_t$ (6) as follows:

$$we_{mt} = Mw_t / |Mw_t|$$

Further, CPU 11 stores in RAM 15 a geomagnetic direction $we_{mo}$ in the world coordinate system at the initial state. Then, CPU 11 obtains a rotation matrix, which will make the current geomagnetic direction $we_{mt}$ and the geomagnetic direction $we_{mo}$ in the world coordinate system at the initial state direct in the same orientation in an X-Y plane in the world coordinate system, and corrects the attitude parameter $T_{L \rightarrow wt}$ using the obtained rotation matrix (step S108). In this manner, CPU 11 corrects the geomagnetic direction, enhancing the accuracy of the attitude presumption.

More specifically, two vectors with no Z-axial component are considered, and further a vector orthogonal to the two vectors is considered, which has the same magnitude as the two vectors and an angle made by the two vectors between them. Then, the rotation matrix is expressed by the compound-matrix transformation of rotation components of these vectors.

[Presumption of Position of Stick Unit]

The process (step S18 in FIG. 6) of presuming the position of the stick unit 10 will be described with reference to a flow chart of FIG. 9 in detail.

FIG. 9 is a flow chart showing the process of presuming the position of the stick unit 10 (position presuming process).

When presuming the attitude of the stick unit 10, the gravity direction $we_{gt}$ of the world coordinate system was presumed at step S103 in FIG. 8. CPU 11 obtains a vector with the component of the gravity direction $we_{gt}$ removed from the acceleration vector in the world coordinate system, and defines the obtained vector as an acceleration $wF_T$ due to an external force (step S201). Further, CPU 11 integrates the acceleration $wF_T$ to obtain a moving velocity $wv_t$ and further integrates the moving velocity $wv_t$ to obtain a moving distance $wD_t$ in the horizontal plane (step S202).

In this case, since a complete integration can be affected by the error accumulation, it is preferable to use an imperfect integration. The dumpling coefficient (time constant) is experimentally adjusted. The moving distance is used in a note-event producing process to be described later (Refer to FIG. 16).

[Calculation of Movement of Top of Stick Unit]

The process (step S19 in FIG. 6) of calculating the movement of the top of the stick unit 10 will be described with reference to a flow charts of FIG. 10 and FIG. 11 in detail.

It is preferable to adjust suitable degrees of loudness or softness of a sound or a musical tone, depending on a velocity of the top of the stick unit 10. A method is known, of using the acceleration sensor 122 to predict the velocity of the stick unit 10, but this method has a problem in accuracy of predicting the velocity of the stick unit 10. Since the stick unit 10 is swung by the user with his or her elbow or shoulder kept at the center of the swinging motion or with his or her straighten elbow, the angular rate and the velocity of the top of the stick unit 10 will not be always in a proportional relationship. Therefore in the present embodiment, the velocity of the top of the stick unit 10 is calculated based on the angular rate and the angular acceleration of the top of the stick unit 10.

FIG. 10 is a flow chart of the process of presuming a movement of the top of the stick unit 10.

For example, an angular-rate vector with a component in the y-axis direction removed is defined as the observation value $\omega V_t = (\omega_{xt}\ 0\ \omega_{zt})$ of the angular rate of the top of the stick unit 10. Then, CPU 11 applies Kalman filter to the observation value, estimating an angular rate $\omega s$ and angular acceleration $\delta \omega s$ of the top of the stick unit 10 (step S210).

The angular-rate components can be obtained by adding the angular-acceleration components to the angular-rate components previously obtained, respectively, and the angular-acceleration components can be obtained using a state model, in which driving noises are added on the same angular-acceleration components as those obtained previously. Using the angular rates of the top of the stick unit 10 obtained in this manner, CPU 11 calculates a recent average vector-direction of these angular rates and presumes that the recent average vector-direction is a turning axis $e_r$ of the top of the stick unit 10 (step S211).

In the present embodiment, Kalman filter is used but IIR filter may be used to smooth the sensor values and differences of their values to obtain the angular rate and angular acceleration of the stick unit 10.

Figure 11:
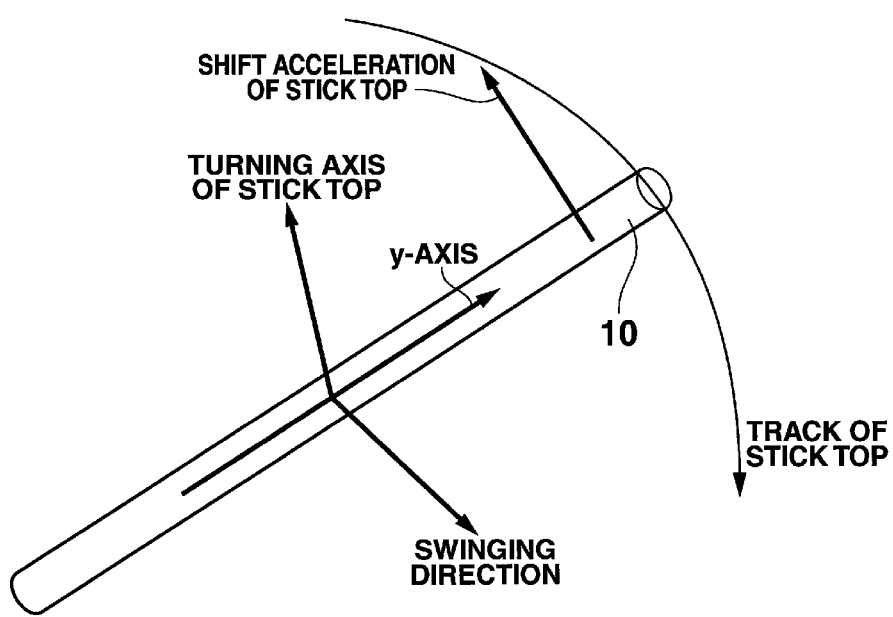
FIG. 11 is a view showing a relationship between a turning axis of the top of the stick unit and a swinging direction.

A direction orthogonal both to the turning axis of the top of the stick unit 10 and the stick direction (the y-axis) is defined as a swinging direction $e_s$ ("outer direction", Refer to FIG. 11). A tangential direction of the turning movement of the top of the stick unit 10 takes the same direction as the swinging direction. CPU 11 calculates an inner product of the acceleration vector $_L A_t$ and the swinging direction $e_s$ to obtain swinging-direction components $_L As_t$ of the acceleration vector of $_L A_t$ (step S212).

[Sound-generation Timing Detecting Process]

The process (step S20 in FIG. 6) of detecting a timing of sound generation will be described with reference to flow charts of FIG. 12 and FIG. 13 in detail.

[Sound-generation Timing Detecting Process (First Embodiment)]

Figure 12:
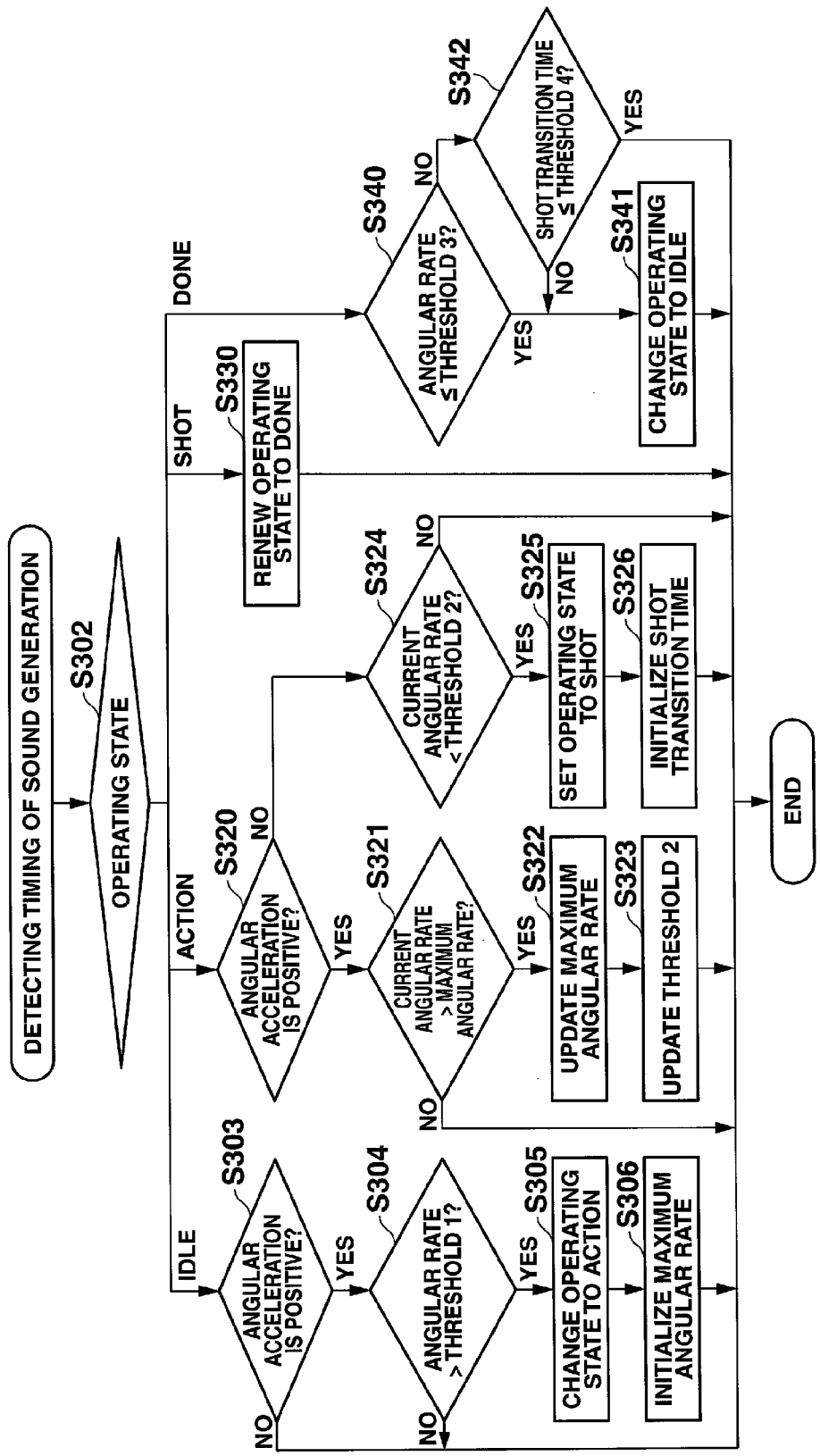
FIG. 12 is a flow chart of a process of detecting a timing of sound generation performed in the first embodiment of the invention.

FIG. 12 is a flow chart showing the process of detecting a timing of sound generation performed in the first embodiment of the invention.

CPU 11 judges in which operating state the stick unit 10 has been held (step S302). Four operating states such as IDLE, ACTION, SHOT, and DONE are prepared for the stick unit 10. When the stick unit 10 is held in the operation state of IDLE, CPU 11 advances to step S303. When the stick unit 10 is held in the operation state of ACTION, CPU 11 advances to step S320. When the stick unit 10 is held in the operation state of SHOT, CPU 11 advances to step S330. When the stick unit 10 is held in the operation state of DONE, CPU 11 advances to step S340.

Figure 14A:
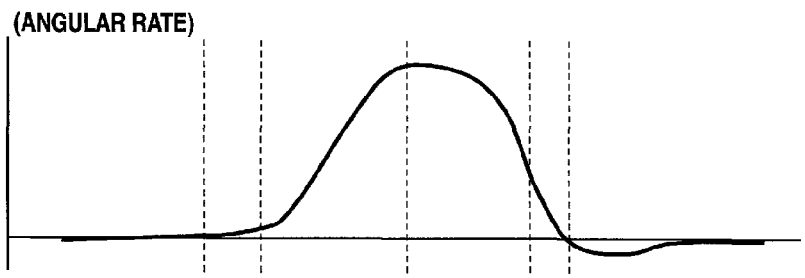
FIG. 14A to FIG. 14D are views showing a typical transition of an operating state of the stick unit.
Figure 14B:
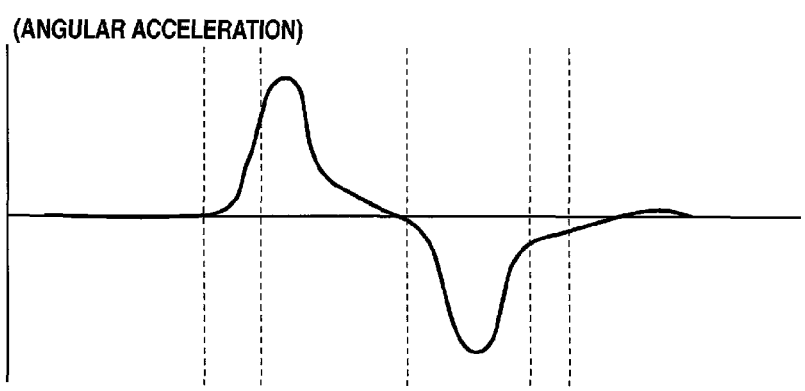
Figure 14D:
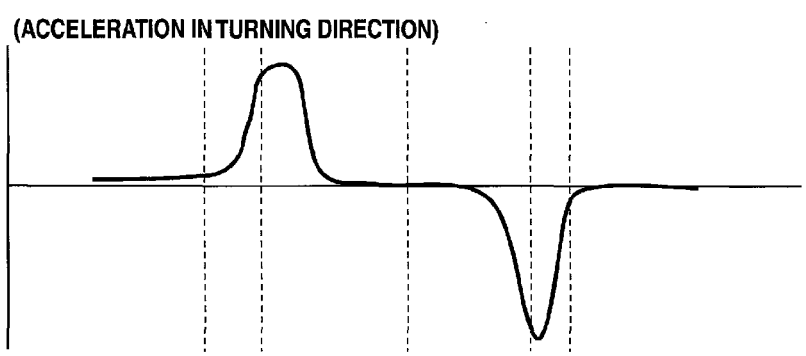
Figure 14C:
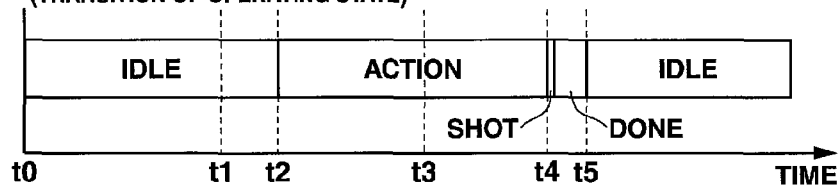

A typical transition of the operating state of the stick unit 10 is shown in FIG. 14C. In FIGS. 14A, 14B, 14C and 14D, the abscissa axis is a temporal axis, that is, a time is plotted along the abscissa axis. In FIG. 14A, the angular rate (magnitude of a vector) is plotted along the ordinate axis. A sign does not mean much but the direction, in which the user starts swinging the stick unit 10 is defined positive for convenience. In FIG. 14B, the angular acceleration (magnitude of a vector) is plotted along the ordinate axis. A sign defines that the positive direction of the angular rate is positive. FIG. 14C is a view showing the transition of the operating state.

In the operation state of IDLE, the stick unit 10 is kept still. In the initial state, the operating state of the stick unit 10 is set to IDLE. At the initial time "t0", the stick unit 10 is held in the operating state of IDLE.

When the angular acceleration of the stick unit 10 is not positive at the initial time "t0" (NO at step S303 in FIG. 12), CPU 11 finishes the process of detecting a timing of sound generation. When the angular acceleration of the stick unit 10 is positive (YES at step S303) and the angular rate of the stick unit 10 is a "threshold value 1" or less (NO at step S304), CPU 11 finishes the process of detecting a timing of sound generation. When the angular rate of the stick unit 10 is higher than the "threshold value 1" (YES at step S304), CPU 11 advances to step S305. In FIGS. 14A, 14B, 14C and 14D, it is shown that the angular rate of the stick unit 10 exceeds the "threshold value 1" at a time of "t2". CPU 11 changes the operating state of the stick unit 10 to ACTION (step S305), and initializes the maximum angular rate of the stick unit 10 to "0" (step S306), finishing the process of detecting a timing of sound generation.

While the stick unit 10 is in the operating state of ACTION, the angular acceleration is applied to the stick unit 10, that is, the angular acceleration is positive (YES at step S320), and CPU 11 compares the current angular rate with the maximum angular rate stored in RAM 15 (step S321). When the current angular rate is greater than the maximum angular rate (YES at step S321), CPU 11 updates the maximum angular rate (step S322), also updating a "threshold value 2" (step S323). When the current angular rate is less than the maximum angular rate (NO at step S321), CPU 11 finishes the process of detecting a timing of sound generation.

The "threshold value 2" is determined depending on the maximum angular rate of the stick unit 10. For example, the "threshold value 2" can be obtained from the following expression: The "threshold value 2"=(maximum angular rate)×C, where C is a value (0~1), which is experimentally determined. In general, it is suitable that C is about 0.1. The "threshold value 2" is determined on the assumption that the stick unit 10 is turned at the angular rate during a period corresponding to a delayed time from the time the shot has been detected to the time a sound is generated. This "threshold value 2" is determined to generate a sound a little before the time at which the sound is supposed to be generated, thereby compensating the delay in radio communication and also the delay caused in the process of sound generation (to be described later). In general, a curve of the angular rate of the shot is assumed to show a shape in proportion to the degrees of loudness or softness of a sound, and the threshold value is determined based on the maximum angular rate.

When the stick unit 10 is brought into a slowing state (t3 in FIG. 14A), the angular acceleration of the stick unit 10 will be less than "0" (t3 in FIG. 14B) (NO at step S320), and CPU 11 advances to step S324. CPU 11 judges whether or not the absolute value of the current angular rate is less than the "threshold value 2" (step S324). While the angular rate of the stick unit 10 is not reduced enough, CPU 11 determined that the absolute value of the current angular rate is not less than the "threshold value 2" (NO at step S324), finishing the process of detecting a timing of sound generation.

When the angular rate of the stick unit 10 has been reduced enough and it is determined that the absolute value of the current angular rate is less than the "threshold value 2" (YES at step S324), CPU 11 determines that it has come close to the timing of shot (YES at step S325). Then, CPU 11 sets the operating state of the stick unit 10 to SHOT at a time of "t4" (step S325), and initializes a shot transition time to "0" (step S326), finishing the process of detecting a timing of sound generation. While the stick unit 10 is in the operating state of SHOT, a notice of the timing of sound generation is given. The operating state of SHOT is used to judge whether or not the timing of sound generation has reached (step S22 in FIG. 6).

When the stick unit 10 is in the operating state of SHOT, CPU 11 renews the operating state of the stick unit 10 to DONE (step S330), finishing the process of detecting a timing of sound generation.

When the stick unit 10 is in the operating state of DONE, CPU 11 judges whether or not the angular rate is a "threshold value 3" or less (step S340). When it is determined that the angular rate is the "threshold value 3" or less (YES at step S340), CPU 11 changes the operating state to IDLE (step S341), finishing the process of detecting a timing of sound generation. When it is determined that the angular rate is higher than the "threshold value 3" (NO at step S340), CPU 11 judges whether or not the shot transition time is a "threshold value 4" or less (step S342). When it is determined that the shot transition time is the "threshold value 4" or less (YES at step S342), CPU 11 finishes the process of detecting a timing of sound generation. Meanwhile, when it is determined that the shot transition time is longer than the "threshold value 4" (NO at step S342), CPU 11 changes the operating state to IDLE (step S341), finishing the process of detecting a timing of sound generation.

As described above, the operating state of DONE is maintained until the angular rate has reduced to the "threshold value 3" or less. This is to prevent a malfunction of generating plural sounds while the stick unit 10 is kept still. But when the angular rate of the stick unit 10 is gradually reduced and the shot transition time, which the angular rate requires to reduce to the "threshold value 3" or less exceeds the "threshold value 4", the operating state of DONE is changed to IDLE.

[Sound-generation Timing Detecting Process (Second Embodiment)]

Figure 13:
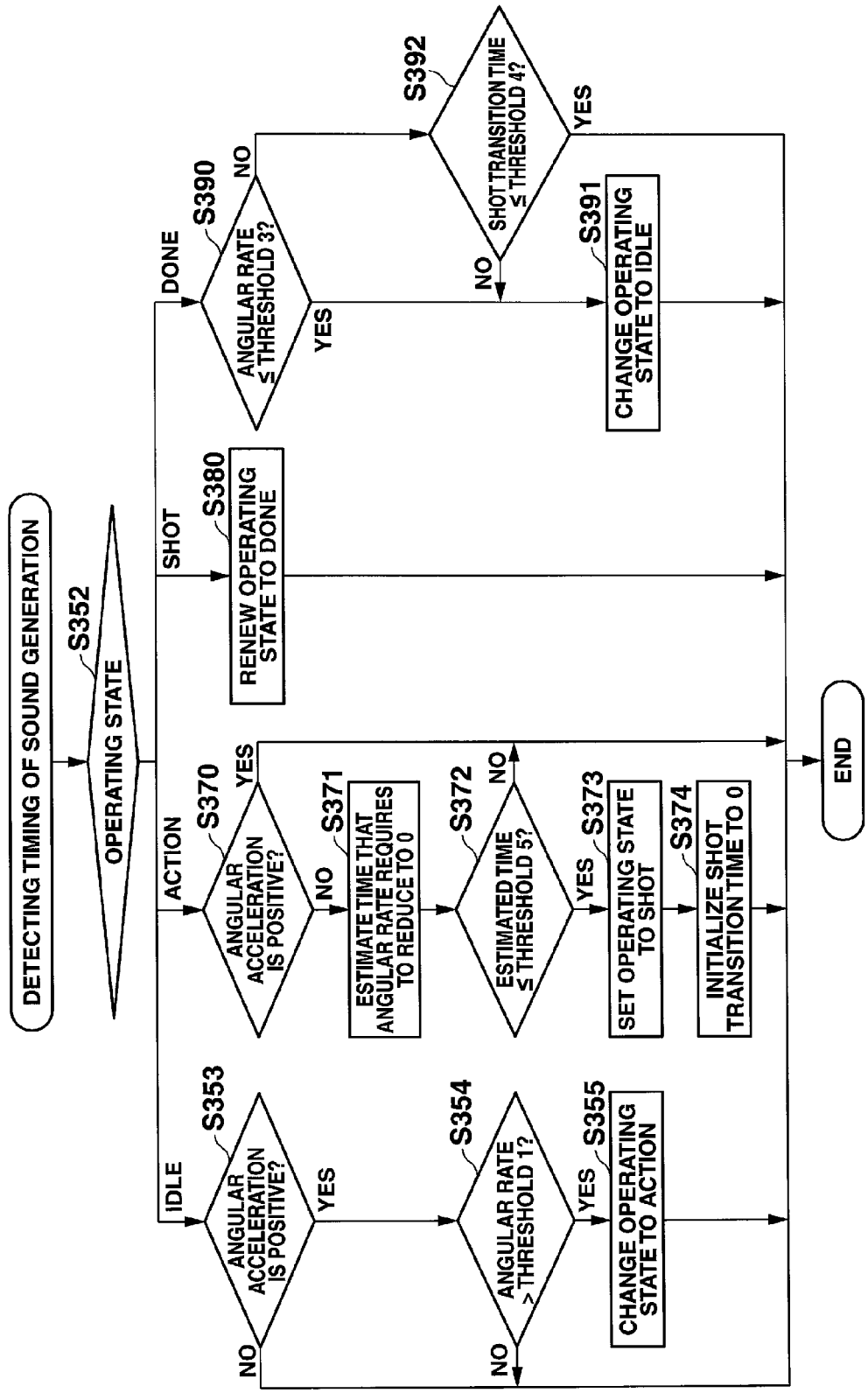
FIG. 13 is a flow chart of a process of detecting the timing of sound generation performed in the second embodiment of the invention.

FIG. 13 is a flow chart of the process of detecting a timing of sound generation performed in the second embodiment of the invention. CPU 11 judges in which operating state the stick unit 10 has been held (step S352). Four operating states such as IDLE, ACTION, SHOT, and DONE are prepared for the stick unit 10. When the stick unit 10 is held in the operation state of IDLE, CPU 11 advances to step S353. When the stick unit 10 is held in the operation state of ACTION, CPU 11 advances to step S370. When the stick unit 10 is held in the operation state of SHOT, CPU 11 advances to step S380. When the stick unit 10 is held in the operation state of DONE, CPU 11 advances to step S390. The typical transition of the operating state of the stick unit 10 is the same as in the first embodiment, as shown in FIG. 14C.

When the angular acceleration of the stick unit 10 is not positive (NO at step S353), CPU 11 finishes the process of detecting a timing of sound generation. When the angular acceleration of the stick unit 10 is positive (YES at step S353) and the angular rate of the stick unit 10 is the "threshold value 1" or less (NO at step S354), CPU 11 finishes the process of detecting a timing of sound generation. When the angular rate of the stick unit 10 exceeds the "threshold value 1" (YES at step S354), CPU 11 advances to step S355. In FIGS. 14A, 14B, 14C and 14D, it is shown that the angular rate of the stick unit 10 exceeds the "threshold value 1" at the time of "t2". CPU 11 changes the operating state of the stick unit 10 to ACTION (step S355), finishing the process of detecting a timing of sound generation.

While the stick unit 10 is in the operating state of ACTION, the angular acceleration is applied to the stick unit 10 for a while, that is, the angular acceleration is positive (YES at step S370), and CPU 11 finishes the process of detecting a timing of sound generation.

When the stick unit 10 is brought into a slowing state ("t3" in FIG. 14A), the angular acceleration of the stick unit 10 will be less than "0" ("t3" in FIG. 14B) (NO at step S370), and CPU 11 advances to step S371. CPU 11 estimates from the angular rate $\omega s_t$ and angular acceleration $\delta\omega s_t$ of the top of the stick unit 10 a time that the angular rate requires to reduce to "0". The estimated time is expressed by "Trem". The estimated time will be given by the following expression:

$$\text{Trem}=|\omega s_t|/|\delta\omega s_t|$$

Then CPU 11 judges whether or not the estimated time is a "threshold value 5" or less (step S372). For example, the "threshold value 5" is about 10 milliseconds.

The "threshold value 5" is set as a delay time from a time when the shot has been detected to a time when a sound is generated. This delay time is prepared to generate a sound a little before the time at which the sound is supposed to be generated, thereby compensating the delay in radio communication and also the delay caused in the process of sound generation. Before the angular rate of the stick unit 10 has reduced enough, CPU 11 determines that the estimated time is longer than the "threshold value 5" (NO step S372), finishing the process of detecting a timing of sound generation. When the angular rate of the stick unit 10 has come close to "0", CPU 11 determines that the estimated time that the angular rate requires to reduce to "0" is the "threshold value 5" or less (YES at step S372, "t4" in FIG. 14C), and then sets the operating state of the stick unit 10 to SHOT (step S373), and initializes the shot transition time to "0" (step S374), finishing the process of detecting a timing of sound generation. While the stick unit 10 is in the operating state of SHOT, the notice of the timing of sound generation is given. The operating state of SHOT is used to judge whether or not the timing of sound generation has reached (step S22 in FIG. 6).

When the stick unit 10 is in the operating state of SHOT, CPU 11 renews the operating state of the stick unit 10 to DONE (step S380), finishing the process of detecting a timing of sound generation.

When the stick unit 10 is in the operating state of DONE, CPU 11 judges whether or not the angular rate is the "threshold value 3" or less (step S390). When it is determined that the angular rate is the "threshold value 3" or less (YES at step S390), CPU 11 changes the operating state to IDLE (step S391), finishing the process of detecting a timing of sound generation. When it is determined that the angular rate is higher than the "threshold value 3" (NO at step S390), CPU 11 judges whether or not the shot transition time is the "threshold value 4" or less (step S392). When it is determined that the shot transition time is the "threshold value 4" or less (YES at step S392), CPU 11 finishes the process of detecting a timing of sound generation. Meanwhile, when it is determined that the shot transition time is longer than the "threshold value 4" (NO at step S392), CPU 11 changes the operating state to IDLE (step S391), finishing the process of detecting a timing of sound generation.

As described above, the operating state of DONE is maintained until the angular rate has reduced to the "threshold value 3" or less. This is to prevent a malfunction of generating plural sounds while the stick unit 10 is kept still. But when the angular rate of the stick unit 10 is gradually reduced and the shot transition time, which the angular rate requires to reduce to the "threshold value 3" or less exceeds the "threshold value 4", the operating state of DONE is changed to IDLE.

[Detection of Volume of Sound Generation]

The process of detecting a volume of sound generation (step S21 in FIG. 6) will be described with reference to a flow chart of FIG. 15 in detail.

Figure 15:
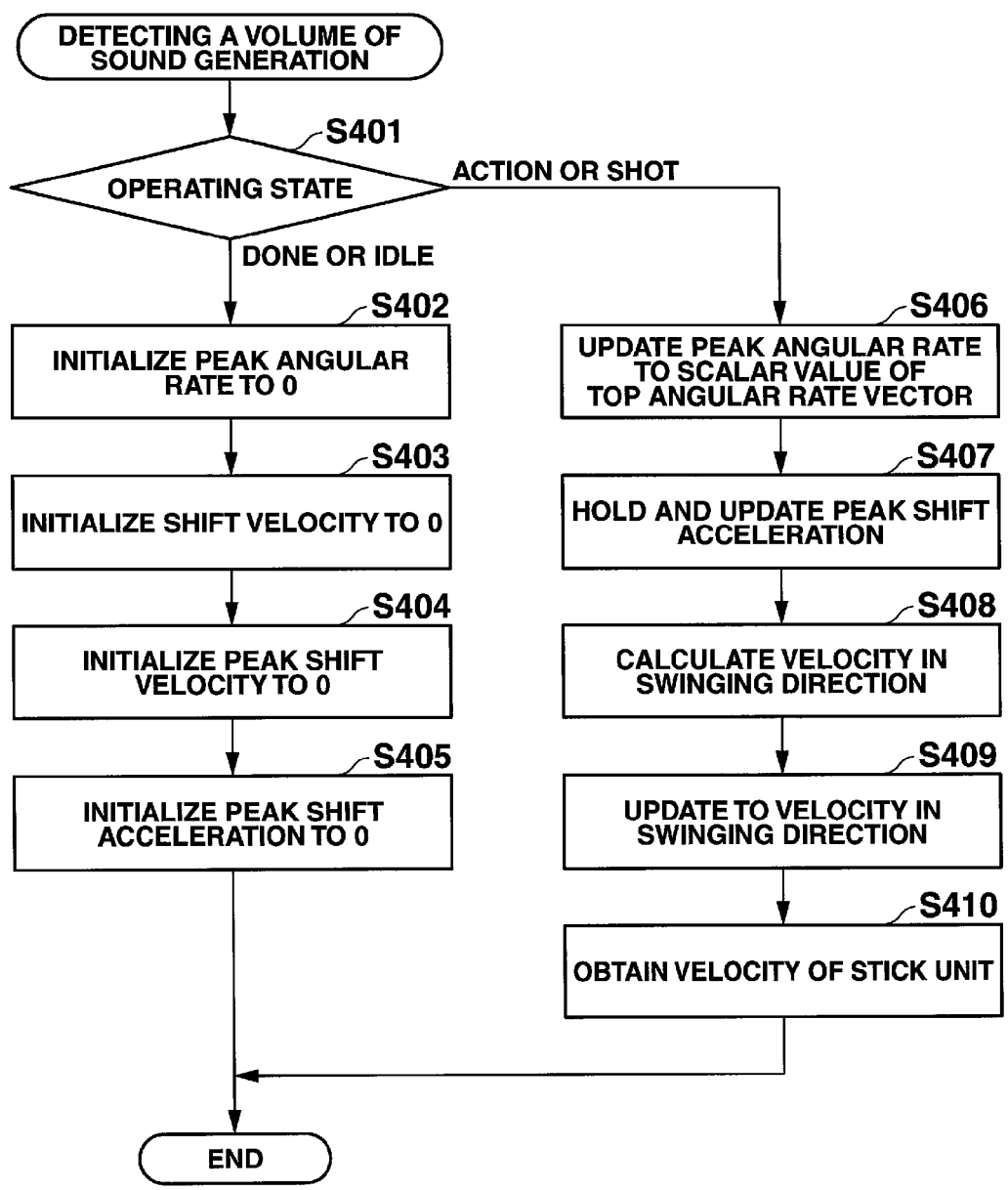
FIG. 15 is a flow chart of a process of detecting a volume of sound generation.

FIG. 15 is a flow chart showing the process of detecting a volume of sound generation.

In step S401, CPU 11 judges in which operating state the stick unit 10 is held, IDLE, ACTION, SHOT or DONE. When the stick unit 10 is held in the operating state of IDLE or DONE, CPU 11 advances to step S402. When the stick unit 10 is held in the operating state of ACTION or SHOT, CPU 11 advances to step S406.

When the stick unit 10 is held in the operating state of IDLE or DONE, CPU 11 initializes a peak angular rate (scalar value) $\omega_{s\,peak}$, a shift velocity $vs_t$ a peak shift velocity $vs_{peak}$, and a peak shift acceleration $as_{peak}$ to "0" (step S402 to step S405).

The peak angular rate (scalar value) $\omega_{s\,peak}$ represents the maximum angular rate of the stick unit 10, which is detected while the stick unit 10 is being swung for generating a sound. The shift velocity $vs_t$ represents a velocity component of parallel movement of the top of the stick unit 10. The current peak shift velocity $vs_{peak}$ represents the maximum value of a shift velocity $_LVS_t$. When the stick unit 10 is brought to the operating state of ACTION or SHOT at step S305 and/or at step 355 in the process of detecting a timing of sound generation (FIG. 12 and FIG. 13), CPU 11 compares the scalar value $|\omega_{st}|$ of the current angular rate vector of the top of the stick unit 10 with the peak angular rate $\omega_{s\,peak}$. When the scalar value $|\omega_{st}|$ is larger than the peak angular rate $\omega_{s\,peak}$, the value of $\omega_{s\,peak}$ is updated to the scalar value $|\omega_{st}|$ (step S406).

CPU 11 holds and updates the peak value $as_{peak}$ of the shift acceleration of the acceleration component $_LAs_t$ in the swinging direction obtained at step S212 in FIG. 10 (step S407).

Further, CPU 11 performs imperfect integration on the acceleration component $_LAs_t$ in the swinging direction obtained at step S212 in FIG. 10 to obtain a velocity $_LVs_t$ in the swinging direction (step S408).

CPU 11 compares the velocity $_LVs_t$ in the swinging direction with the peak shift velocity $vs_{peak}$. When the velocity $_LVs_t$ is larger than the peak shift velocity $vs_{peak}$, the peak shift velocity $vs_{peak}$ is updated to the value of $_LVs_t$ (step S409).

Then, CPU 11 obtains a velocity (sound volume) of the stick unit 10 from the three peak values (step S410). For example, the velocity is obtained from the following expression (5) with weights added.

$$P\text{shot}=a1\cdot\omega_{s\,peak}+a2\cdot vs_{peak}+a3\cdot as_{peak}$$

where a1, a2, and a3 are mixing parameters and determined in an experiment. Pshot is used to represent a loudness of a sound concerning the shot.

[Production of Note-on Event]

The process of producing the note-on event (step S23 in FIG. 6) will be described with reference to a flow chart of FIG. 16 in detail.

Figure 16:
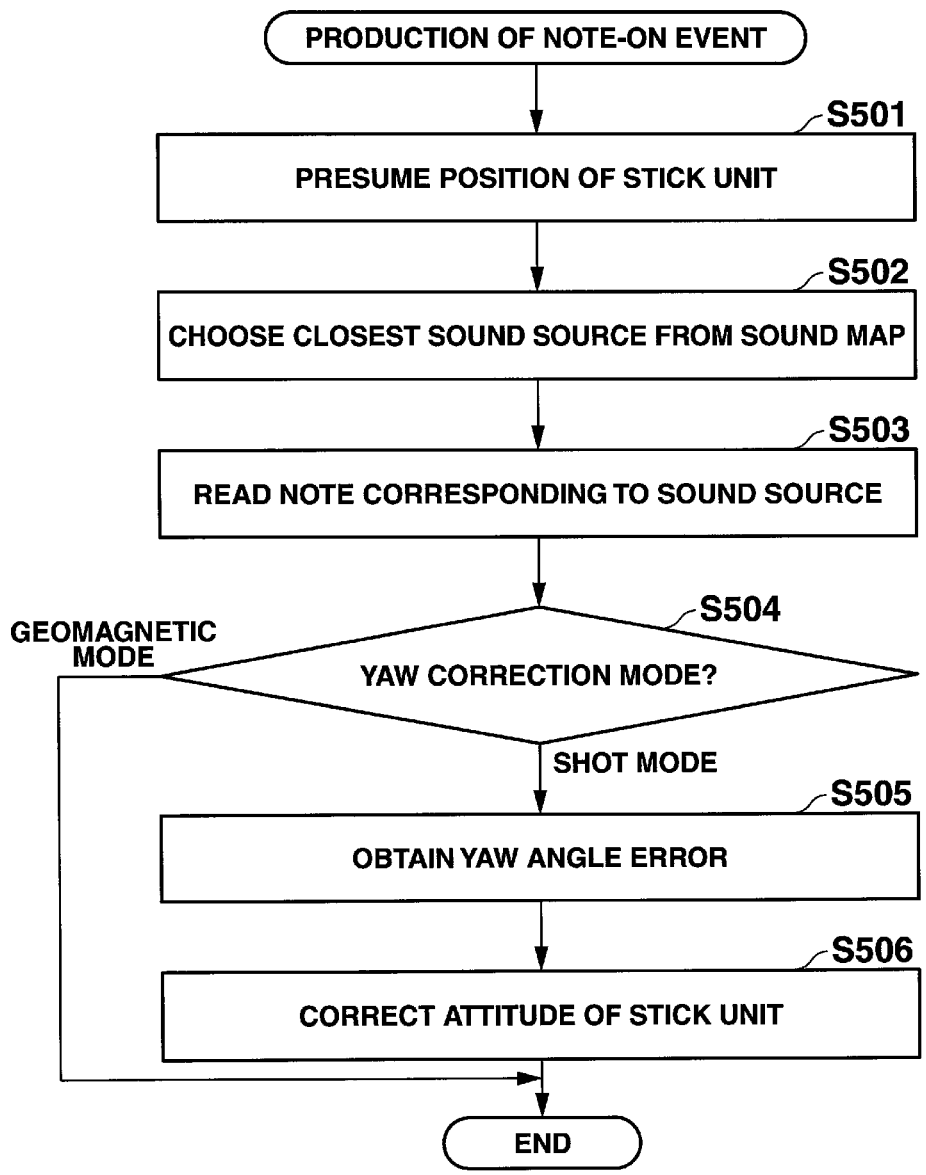
FIG. 16 is a flow chart of a process of producing a note event.

FIG. 16 is a flow chart showing the process of producing the note-on event.

At the time of shot, it is decided which one of the virtual sound sources disposed in the space is made to sound by such shot. Since the shot timing is previously detected in anticipation of delay in the system, CPU 11 presumes a position of the stick unit 10, at which a sound is generated (step S501). Since the angular rate and the angular acceleration of the top of the stick unit 10 are known, CPU 11 can presume the position of the stick unit 10 by obtaining the attitude that the stick unit 10 will take after the estimated time duration of Trem. More specifically, the time duration of Trem is broken into short time durations, and the short time duration is expressed as "T". CPU 11 obtains the angular-rate vectors in respective short time durations from the angular rate vector and angular acceleration in the previous short time duration, and further obtains the rotation angle vectors in the respective short time durations from the angular rate vectors. CPU 11 uses these rotation angle vectors to obtain a compound matrix, thereby estimating the following attitude of the stick unit 10. CPU 11 repeatedly performs the above process throughout the entire time of Trem, and estimates the attitude, which the stick unit 10 will take after the time duration of Trem (seconds), as $T_{L-->wt+Trem}$ From the attitude parameter, the position of the stick unit 10 in the y-axis direction in the world coordinate system can be obtained: $P_y=(P_yx\ P_yY\ P_yZ)^T$ When six sound sources are disposed on a sound map of the world coordinate system, it is presumed that positions of these six sound sources are given as follows:
Sound Source 1: (0, 1, 0) in front.
Sound Source 2: (sin 60, cos 60, 0) 60 deg. on the right ahead.
Sound Source 3: (−sin 60, cos 60, 0) 60 deg. on the left ahead.
Sound Source 4: (0, cos 45, sin 45) in the upper part ahead.
Sound Source 5: (cos 45 sin 60, cos 45 cos 60, sin 45) 60 deg. on the right ahead and 45 deg. in upper part.
Sound Source 6: (−cos 45 sin 60, cos 45 cos 60, sin 45) 60 deg. on the left ahead and 45 deg. in upper part.

Position information of each sound source and a tone color corresponding to each of the numbers of the sound sources are previously stored in ROM 14.

CPU 11 calculates distances form the position, at which the stick unit 10 is presumed to generate a sound (step S501) to the respective positions of the sound sources $P_{si}=(P_{si}X\ P_{si}Y\ P_{si}Z)^T$ and chooses the closest sound source among them as the current sound source which will generate a sound in response to the shot (step S502).

Euclidean distances are calculated as the distances. It will be effective to use Euclidean distance with weighted dull components as the distance in the direction of swinging axis. Since the swinging direction is the moving direction of the stick unit 10, the accuracy is not good. Therefore, it is preferable to use more weighted distance than the turning axis direction.

An orientation can be transformed into a representation of pitch, yaw, and roll angle. It is possible to use the positions of the sound sources transformed into the angle representation and the position of the stick unit 10 transformed into the angle representation to obtain the distances between them. It is possible to use distances weighted differently in the pitch direction and in yaw direction. It is preferable that the weight in the roll direction is 0.

Now, it is presumed that "i" represents the number of the sound source corresponding to the shot (that is, the sound source chosen at step S502) or the number of the sound source found in a sound searching process. This sound searching process will be described later with reference to a flow chart of FIG. 17 in detail. CPU 11 reads the note corresponding to the i-th sound source from the table (step S503), thereby obtaining the note to sound.

CPU 11 judges whether the yaw correction mode has been set to the geomagnetic mode at step S79 or to the shot mode at step S80 (step S504). When the yaw correction mode has been set to the geomagnetic mode, CPU 11 finishes the note event producing process. Meanwhile, when the yaw correction mode has been set to the shot mode, CPU 11 obtains a yaw angle error between the sound source and the stick unit 10 (step S505). More specifically, CPU 11 obtains the direction vector of the stick unit 10 from the attitude parameter, and uses the position information of the sound source in the world coordinate system as the direction vector of the sound source. Then, CPU 11 obtains a difference between vector angles consisting of X and Y components of the above two direction vectors as the yaw angle error. The yaw angle error is a rotation error about the Z-axis. CPU 11 obtains a rotation matrix of the rotation axis of the Z-axis, and corrects the attitude of the stick unit 10 using the rotation matrix (step S506).

[Sound Search]

A rearranged process in the sound searching process (step S502 in FIG. 16) will be described with reference to a flow chart of FIG. 17 in detail.

Figure 17:
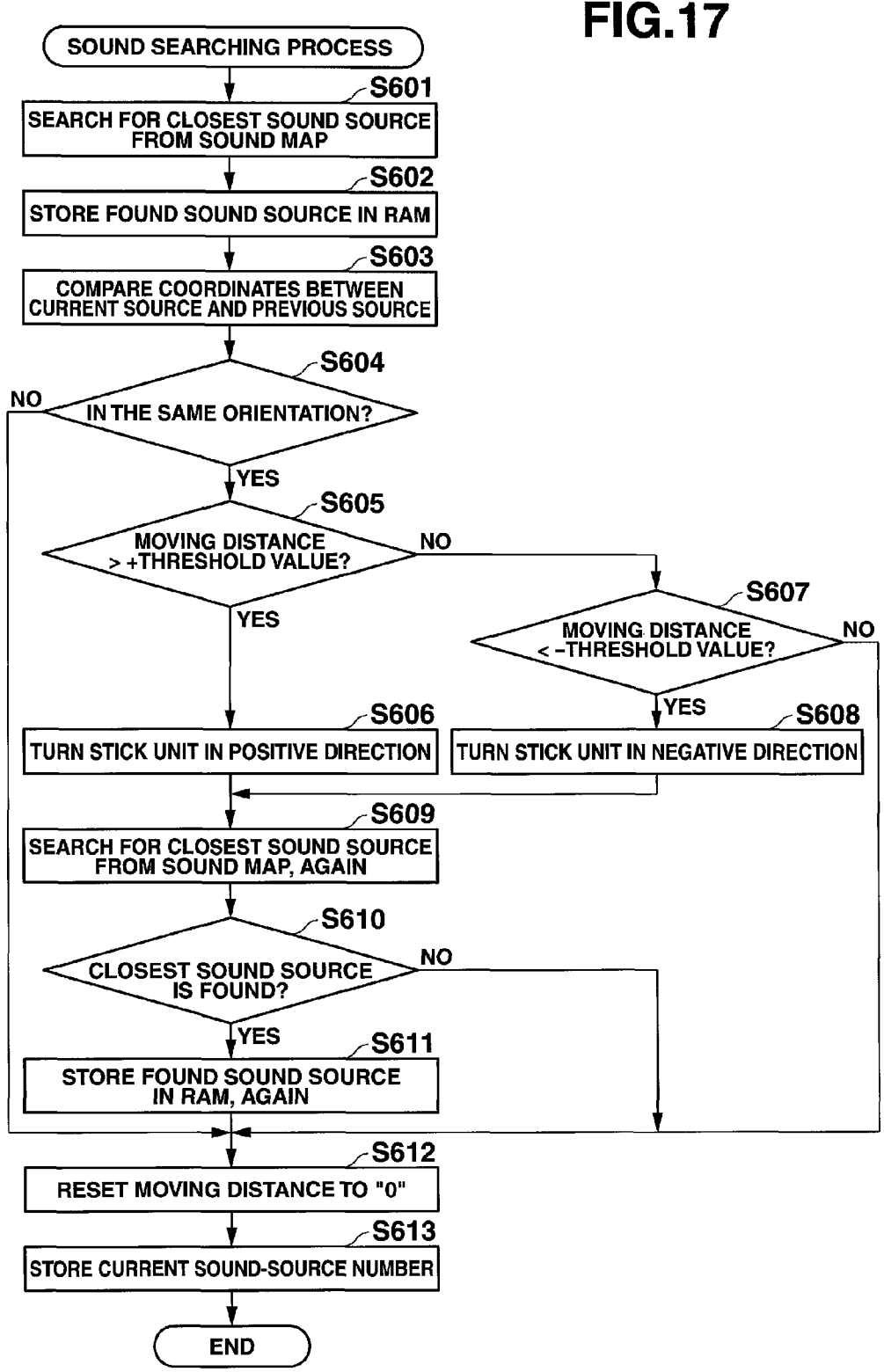
FIG. 17 is a flow chart of a rearranged process in a sound searching process.

FIG. 17 is a flow chart showing the rearranged process in the sound searching process (step S502 in FIG. 16). The present process is performed in place of the process at step S502 in FIG. 16. The present process is performed after the process at step S501 in FIG. 15, and after the present process is performed at step S613 in FIG. 17, CPU 11 returns to step S503 in FIG. 16.

CPU 11 searches for the closest sound source among the sound sources disposed on the sound map in the same manner as in the sound source searching process at step S502 in FIG. 16 (step S601). Then CPU 11 gives the sound-source number "i" to the currently searched sound source and stores in RAM 15 (step S602). CPU 11 reads the position coordinate of the previous sound-source number to compare with the position coordinate of the current sound-source number "i". In this case, components in the X and Y-coordinates are compared (step S603). The components in the vertical direction, that is, components in the Z-axis direction are not compared and correction in the vertical direction is not made in the present embodiment.

CPU 11 judges whether or not the two position coordinates (current and previous one) are in the same orientation (step S604). When it is determined that the two position coordinates are in the same orientation (YES at step S604), CPU 11 judges whether or not the horizontal component of the moving distance obtained at step S202 in FIG. 9 is larger than a predetermined positive threshold value (step S605). When it is determined that the horizontal component of the moving distance is larger than the predetermined positive threshold value (YES at step S605), CPU 11 turns the position $P_y$ of the top of the stick unit 10 by a previously determined turning angle in the positive direction on the horizontal plane (step S606). When it is determined NO at step S605, CPU 11 judges whether or not the horizontal component of the moving distance is smaller than the predetermined negative threshold value (step S607). When it is determined that the horizontal component of the moving distance is smaller than the predetermined negative threshold value (YES at step S607), CPU 11 turns the position $P_y$ of the top of the stick unit 10 by a previously determined turning angle in the negative direction on the horizontal plane (step S608).

After correcting the orientation of the top of the stick unit 10 as described above, CPU 11 searches for the closest sound source from the sound map using the same sound searching process as the process at step S502 in FIG. 16 (step S609). CPU 11 judges whether or not the closest sound source has been found from the sound map (step S610). When the closest sound source has been found (YES at step S610), CPU 11 updates and gives the current sound-source number to the newly found sound source and stores the newly found sound source in RAM 15 (step S611). When the closest sound source has not been found (NO at step S610), the previous sound-source number is maintained.

Then, CPU 11 resets the moving distance to "0" to obtain the moving distance from the current shot to the following shot (step S612). Further, CPU 11 stores in RAM 15 the currently employed sound-source number as the previous sound-source number (step S613).

[Sound Generating Process]

The sound generating process will be described with reference to a flow chart of FIG. 18.

Figure 18:
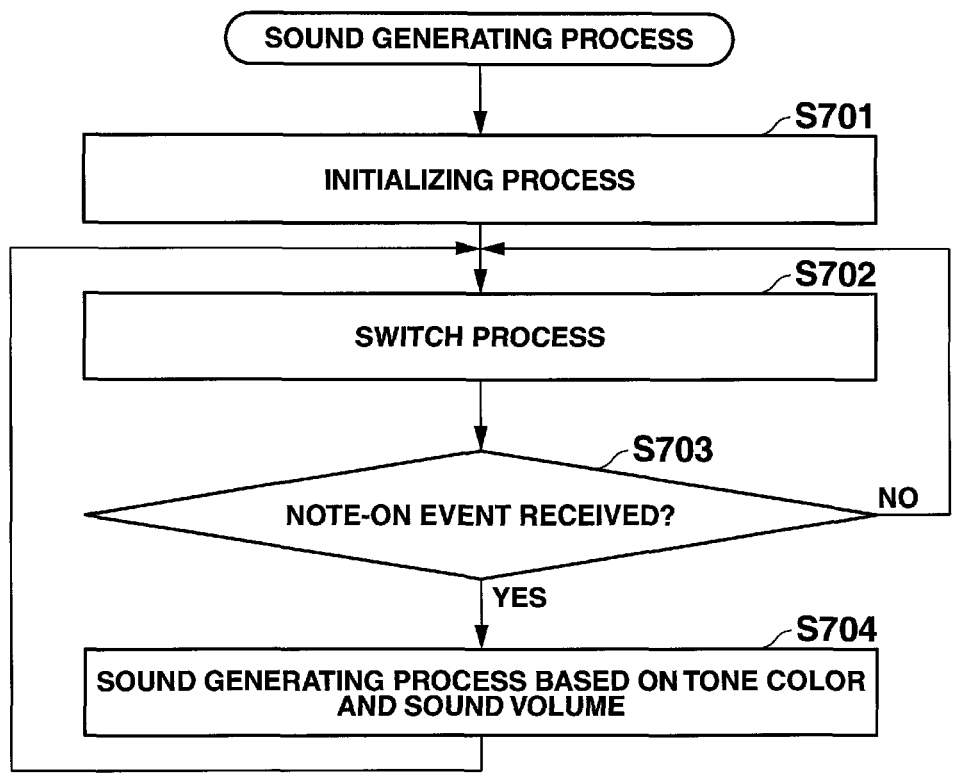
FIG. 18 is a flow chart of a sound generating process performed by a sound generating unit.

FIG. 18 is a flow chart of the sound generating process performed by the sound generating unit 30.

When the power of the sound generating unit 30 is turned on, CPU 31 of the sound generating unit 30 (shown in FIG. 1) performs an initializing process, clearing RAM 34, clearing an image displayed on the displaying unit 35, and clearing the sound source unit 371 (step S701). Then, CPU 31 performs a switch process, where CPU 31 specifies a sound volume and a sound color desired by the player in accordance with the switch operation on the input unit 36, and stores the specified data in RAM 34 (step S702).

CPU 31 judges whether or not I/F 32 has received a new note-on event (step S703). When it is determined that I/F 32 has received a new note-on event (YES step S703), CPU 31 performs a process of giving the sound source unit 371 an instruction of generating a musical tone of the specified tone color and having the specified sound volume (step S704). When the process finishes, CPU 31 returns to step S702.

In the foregoing description, the configuration and operation of the playing apparatus 1 according to the embodiment of the invention has been described.

In the present embodiment of the invention, CPU 11 obtains, at the constant intervals, the acceleration detected by the acceleration sensor 122 and the angular rate detected by the angular rate sensor 123. CPU 11 stores in RAM 15 the obtained acceleration and angular rate together with the attitude parameter of the stick unit 10 maintained in the initial still state, including the acceleration due to the gravity detected by the acceleration sensor 122 with the stick unit 10 held in the initial still state. CPU 11 updates the attitude parameter in accordance with the angular rate detected by the angular rate sensor 123 at the constant intervals, and calculates an acceleration in the gravity direction from the detected acceleration in accordance with the updated attitude parameter. Further, CPU 11 accumulates the calculated accelerations of given intervals and corrects the accumulated accelerations so as to conform to the acceleration stored in RAM 15.

Therefore, even if the stick unit 10 is moved at a high velocity, CPU 11 can presume the attitude of the stick unit 10 with a high degree of accuracy by correcting the gravity direction.

In the present embodiment of the invention, the magnetic sensor 121 detects three geomagnetic components of a geomagnetic vector respectively in three axial directions while the stick unit 10 is held in the initial still state, wherein the three axial directions include the longitudinal axial direction of the stick unit 10 and are orthogonal to each other. CPU 11 converts the three geomagnetic components on the basis of the attitude parameter into the geomagnetic components in another three axial directions and stores the converted geomagnetic components in RAM 15. CPU 11 obtains, at the constant intervals, the geomagnetic components detected by the magnetic sensor 121 respectively in the three axial directions, and converts the obtained three axial geomagnetic components on the basis of the attitude parameter into the geomagnetic components in said another three axial directions. Further, CPU 11 accumulates the converted respective geomagnetic components of given intervals and corrects the accumulated respective geomagnetic components so as to conform to the geomagnetic components stored in RAM 15.

Therefore, even if the stick unit 10 is moved at a high velocity, CPU 11 can presume the attitude of the stick unit with a high degree of accuracy by correcting the geomagnetic direction.

In the present embodiment of the invention, when the angular rate obtained by the angular rate sensor 123 has reduced to the "threshold value 2" or less after increasing to the "threshold value 1" or larger, CPU 11 sends the note-on event to the sound generating unit 30. The "threshold value 2" is a value corresponding to the maximum value of the angular rate obtained by the angular rate sensor 123, which reaches after exceeding the "threshold value 1". (More specifically, a value obtained by multiplying the maximum value by a certain rate.)

Therefore, in anticipation of delay in generation of a sound, CPU 11 sets the timing of sound generation a predetermined time earlier than the timing at which the sound is supposed to be generated, enhancing accuracy of the timing of sound generation.

In the present embodiment of the invention, CPU 11 estimates a time which the angular rate obtained by the angular rate sensor 123 requires to reduce to "0" after exceeding the "threshold value 1". When the estimated time reduces less than the "threshold value 5", CPU 11 sends the note-on event to the sound generating unit 30.

Therefore, in anticipation of delay in generation of a sound, CPU 11 sets the timing of sound generation a predetermined time earlier than the timing at which the sound is supposed to be generated, enhancing the accuracy of the timing of sound generation.

In the present embodiment of the invention, on the basis of the angular rate obtained by the angular rate sensor 123, CPU 11 calculates the angular rate and angular acceleration of the top of the stick unit 10. Further, based on the calculated angular rate and angular acceleration of the top of the stick unit 10, CPU 11 estimates a time which the angular rate obtained by the angular rate sensor 123 requires to reduce to 0 after exceeding the "threshold value 1". In this way, CPU 11 can estimate the accurate time, which the angular rate requires to reduce to 0.

In the present embodiment of the invention, on the basis of the angular rate obtained by the angular rate sensor 123, CPU 11 estimates the direction of the turning axis, about which the stick unit 10 is swung, and calculates the angular rate of the top of the stick unit 10 based on the angular rate with the component in the longitudinal direction of the stick unit 10 removed from the angular rate obtained by the angular rate sensor 123. Based on the estimated recent direction of the turning axis and the calculated recent angular rate of the top of the stick unit 10, CPU 11 calculates the position of the stick unit 10 in the world coordinate system after a predetermined time, and chooses the one closest to the calculated position among the plural sound areas on the sound map, sending the sound generating unit 30 a note-on event of a musical tone corresponding to the chosen sound area.

Therefore, even if the stick unit 10 is swung slantwise, a musical tone can be generated, having a tone color corresponding to the position, which the stick unit 10 will take at the shot timing.

Further, in the present embodiment of the invention, on the basis of the angular rate obtained by the angular rate sensor 123, CPU 11 estimates the direction of the turning axis, about which the stick unit 10 is swung, and calculates the angular rate of the top of the stick unit 10 based on the angular rate with the component in the longitudinal direction of the stick unit 10 removed from the angular rate obtained by the angular rate sensor 123. Based on the estimated recent direction of the turning axis and the calculated recent angular rate of the top of the stick unit 10, CPU 11 calculates the position of the stick unit 10 in the world coordinate system after a predetermined time. Further, CPU 11 calculates the moving distance of the stick unit 10 based on the acceleration obtained by the acceleration sensor 122. Based on the calculated position and moving distance, CPU 11 corrects the position of the stick unit 10 in the world coordinate system after a predetermined time, and chooses one closest to the corrected position among plural areas on the sound map, sending the sound generating unit 30 a note-on event of a musical tone corresponding to the chosen area.

Therefore, even if the stick unit 10 is swung diagonally and translated, a musical tone can be generated, having a tone color corresponding to the position, which the stick unit 10 will take at the shot timing.

Further, in the present embodiment of the invention, on the basis of the angular rate obtained by the angular rate sensor 123, CPU 11 calculates the maximum angular rate of the stick unit 10 while the stick unit 10 is being operated. Based on the acceleration obtained by the acceleration sensor 122, CPU 11 calculates the maximum acceleration of the stick unit 10 while the stick unit 10 is being operated. On the basis of the calculated maximum angular rate and maximum acceleration of the stick unit 10, CPU 11 controls the sound volume of a musical tone to be generated.

Therefore, even if the virtual sound source is vertically disposed in the world coordinate system, a sound volume can be appropriately controlled based on the strength of the winging motion of the stick unit 10.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications in the following claims and their equivalents.

What is claimed is:

1. A playing apparatus comprising:
   a holding member operated by a user;
   an angular rate sensor mounted on the holding member for obtaining angular rates of the holding member respectively in three axial directions, the three axial directions including a first direction corresponding to a longitudinal axis of the holding member, a second direction that is perpendicular to the first direction, and a third direction that is perpendicular to the first direction and the second direction;
   a memory configured to store a sound source map including plural areas disposed in a virtual space and sound sources corresponding respectively to the plural areas; and
   a processor which is configured to:
   first calculate a direction of a rotation axis of the holding member based on the angular rates of the holding member in the first direction, the second direction, and the third direction obtained by the angular rate sensor;
   second calculate an angular rate of a top of the holding member based on the angular rates of the holding member obtained by the angular rate sensor with the angular rate in the first direction removed;
   presume a position of the holding member in the virtual space after a predetermined time, based on a recent first calculated direction of the rotation axis of the holding member and a recent second calculated angular rate of the top of the holding member;
   determine whether the presumed position belongs to one of the plural areas of the stored sound source map; and
   provide a sound generation signal to a sound generating device for instructing a generation of a sound which is assigned to the determined one of the plural areas.

2. The playing apparatus of claim 1, wherein the sound source map includes a tone color assigned to each of the plural areas, and the processor is configured to include in the sound generation signal the tone color assigned to the determined one of the plural areas.

3. A sound generating method in a playing apparatus, wherein the playing apparatus comprises (i) a holding member operated by a user, (ii) an angular rate sensor mounted on the holding member for obtaining angular rates of the holding member respectively in three axial directions, the three axial directions including a first direction corresponding to a longitudinal axis of the holding member, a second direction that is perpendicular the first direction, and a third direction that is perpendicular to the first direction and the second direction, and (iii) a memory configured to store a sound source map including plural areas disposed in a virtual space and sound sources corresponding respectively to the plural areas, the method comprising:
   first calculating a direction of a rotation axis of the holding member based on the angular rates of the holding member in the first direction, the second direction, and the third direction obtained by the angular rate sensor;
   second calculating an angular rate of a top of the holding member based on the angular rates of the holding member obtained by the angular rate sensor with the angular rate in the first direction removed;
   presuming a position of the holding member in the virtual space after a predetermined time, based on a recent first calculated direction of the turning axis of the holding member and a recent second calculated angular rate of the top of the holding member;
   determining whether the presumed position belongs to one of the plural areas of the stored sound source map; and
   providing a sound generation signal to a sound generating device for instructing a generation of a sound which is assigned to the determined one of the plural areas.

4. The method of claim 3, wherein the sound source map includes a tone color assigned to each of the plural areas, and in providing the sound generation signal, the tone color assigned to the determined one of the plural areas is included in the sound generation signal.

5. A non-transitory computer readable recording medium mounted on a playing apparatus, wherein the playing apparatus comprises (i) a computer, (ii) a holding member operated by a user, (iii) an angular rate sensor mounted on the holding member for obtaining angular rates of the holding member respectively in three axial directions, the three axial directions including a first direction corresponding to a longitudinal axis of the holding member, a second direction that is perpendicular to the first direction, and a third direction that is perpendicular to the first direction and the second direction, and (iv) a memory configured to store a sound source map including plural areas disposed in a virtual space and sound sources corresponding respectively to the plural areas, the non-transitory computer readable recording medium having recorded thereon a computer program which is executable to control the computer to perform functions comprising:
   first calculating a direction of a rotation axis of the holding member based on the angular rates of the holding member in the first direction, the second direction, and the third direction obtained by the angular rate sensor;

second calculating an angular rate of a top of the holding member based on the angular rates of the holding member obtained by the angular rate sensor with the angular rate in the first direction removed;

presuming a position of the holding member in the virtual space after a predetermined time, based on a recent first calculated direction of the turning axis of the holding member and a recent second calculated angular rate of the top of the holding member;

determining whether the presumed position belongs to one of the plural areas of the stored sound source map; and providing a sound generation signal to a sound generating device for instructing a generation of a sound which is assigned to the determined one of the plural areas.

6. The recording medium of claim 5, wherein the sound source map includes a tone color assigned to each of the plural areas, and the computer is configured to include in the sound generation signal the tone color assigned to the determined one of the plural areas.

* * * * *

UNITED STATES PATENT AND TRADEMARK OFFICE
CERTIFICATE OF CORRECTION

PATENT NO. : 9,018,508 B2 Page 1 of 1
APPLICATION NO. : 13/854686
DATED : April 28, 2015
INVENTOR(S) : Keiichi Sakurai et al.

It is certified that error appears in the above-identified patent and that said Letters Patent is hereby corrected as shown below:

In the claims

Column 22, claim 3, line 8, after "perpendicular" insert --to--.

Signed and Sealed this
Twentieth Day of October, 2015

Michelle K. Lee
*Director of the United States Patent and Trademark Office*